US005659584A

United States Patent [19]
Uesugi et al.

[11] Patent Number: 5,659,584
[45] Date of Patent: Aug. 19, 1997

[54] DATA RECEIVING SYSTEM FOR RECEIVING DATA SIGNAL FADED AND DELAYED

[75] Inventors: Mitsuru Uesugi, Yokohama; Sadaki Futagi, Sagamihara; Koichi Homma, Yokohama, all of Japan

[73] Assignee: Matsushita Electric Industrial Co., Ltd., Osaka, Japan

[21] Appl. No.: 593,956

[22] Filed: Jan. 30, 1996

[30] Foreign Application Priority Data

Jan. 31, 1995 [JP] Japan ............... 7-014800

[51] Int. Cl.⁶ .................................. H04B 7/10
[52] U.S. Cl. ............................ 375/347; 375/348
[58] Field of Search ................... 375/347, 346, 375/349, 350; 455/296, 303, 304, 306, 63, 65, 276.1, 278.1; 329/318, 320, 349, 353

[56] References Cited

U.S. PATENT DOCUMENTS 5,440,590  8/1995  Birchler et al. ............... 375/347

FOREIGN PATENT DOCUMENTS

| 435543 | 2/1992 | Japan . |
| 435544 | 2/1992 | Japan . |
| 435545 | 2/1992 | Japan . |
| 435546 | 2/1992 | Japan . |
| 435547 | 2/1992 | Japan . |
| 435548 | 2/1992 | Japan . |
| 435549 | 2/1992 | Japan . |
| 435550 | 2/1992 | Japan . |
| 5344029 | 12/1993 | Japan . |
| 629890 | 2/1994 | Japan . |

*Primary Examiner*—Stephen Chin
*Assistant Examiner*—Kevin Kim
*Attorney, Agent, or Firm*—Lowe, Price, LeBlanc & Becker

[57] ABSTRACT

A data signal composed of a desired signal faded and delayed and an interference signal faded and delayed is received by a pair of antennas. A direct component of the interference signal and a delay component of the desired signal are removed from the data signals received by the antennas in a decision-feedback type of desired signal equalizing unit, and the direct component of the desired signal and the delay component of the interference signal are removed from the data signals in a decision-feedback type of interference signal equalizing unit. Also, a delay component of the interference signal is removed in the desired signal equalizing unit by subtracting a replica of the delay component of the interference signal produced in a backward tap from a demodulated interference signal produced in the interference signal equalizing unit in a previous operation, and a delay component of the desired signal is removed in the interference signal equalizing unit by subtracting a replica of the delay component of the desired signal produced in another backward tap from a demodulated desired signal produced in the desired signal equalizing unit in the previous operation. Therefore, the demodulated desired signal agreeing with the desired signal is output from the desired signal equalizing unit, and the demodulated interference signal agreeing with the interference signal is output from the interference signal equalizing unit.

29 Claims, 12 Drawing Sheets

DATA RECEIVING SYSTEM FOR RECEIVING DATA SIGNAL FADED AND DELAYED

BACKGROUND OF THE INVENTION

1. Field of the Invention

The present invention relates to a data receiving system in which adverse influence of an interference signal is removed in a data transmission to improve a frequency utilizing efficiency.

2. Description of the Related Art

In cases where an intensity level of a received signal is low in a mobile communication, a ratio of a noise level to a receiving level of a desired signal often becomes high. In this case, a noise is included in an audio signal generated in an analog circuit, and a bit error occurs in a digital communication. Also, in cases where an undesired signal having a high level exists as an interference signal in the same frequency band as that of a desired signal or in a frequency band adjacent to that of the desired signal, even though a receiving level of the desired signal is high, a receiving quality for the desired signal deteriorates in the same manner as that in cases where a receiving level of the desired signal is low. The undesired signal functioning as an interference signal is mainly transmitted from an undesired base station, and it has been thought until recent years that the removal of the undesired signal having a high level is impossible. Therefore, the arrangement of base stations and the allocation of frequencies cannot be arbitrarily performed, and a circuit design becomes complicate. In other words, the existence of an undesired signal having a high intensity is a large obstacle to improve the frequency utilizing efficiency. In recent years, a method for removing the interference signal has been reported. Two representative conventional removing methods are described hereinafter.

2.1. PREVIOUSLY PROPOSED ART:

FIG. 1 is a block diagram of a signal generating system. The signal generating system is used as a model of propagation path.

As shown in FIG. 1, a desired signal X(t) generated in a desired signal generating unit 1 is generally deformed by the influence of the fading and delay occurring in a propagation path. To model the influence of the fading and delay on the desired signal X(t), the desired signal X(t) is multiplied by a complex number A0 in a weighting unit 7 to generate a direct component (or a non-delayed component) A0*X(t) based on the influence of the fading, and the desired signal X(t) is delayed by a delayed time τ in a delaying unit 3 to generate a delayed signal X(t–τ) based on the influence of the delay. Because the delayed signal receives the influence of the fading regardless of the direct component, the delayed signal is multiplied by a complex number A1 in a weighting unit 8 to generate a delayed component A1*X(t–τ) based on the influence of the fading and delay. Also, an interference signal Y(t) generated in an interference signal generating unit 2 is generally deformed by the influence of the fading and delay occurring in another propagation path in the same manner as the desired signal X(t). Therefore, the interference signal Y(t) is multiplied by a complex number B0 in a weighting unit 9 to generate a direct component B0*Y(t) based on the influence of the fading, and the interference signal Y(t) is delayed by the delayed time τ in a delaying unit 4 and is multiplied by a complex number B1 in a weighting unit 10 to generate a delayed component B1*Y(t–τ) based on the influence of the fading and delay. Thereafter, the direct component A0*X(t), the delayed component A1*X(t–τ), the direct component B0*Y(t) and the delayed component B1*Y(t–τ) are summed in an adder 15 to generate a first receiving signal Sa.

Also, in the same manner, the desired signal X(t) is multiplied by a complex number C0 in a weighting unit 11 to generate a direct component C0*X(t) based on the influence of the fading, and the desired signal X(t) is delayed by the delayed time τ in a delaying unit 5 and is multiplied by a complex number C1 in a weighting unit 12 to generate a delayed component C1*X(t–τ) based on the influence of the fading and delay. Also, the interference signal Y(t) is multiplied by a complex number D0 in a weighting unit 13 to generate a direct component D0*Y(t) based on the influence of the fading, and the interference signal Y(t) is delayed by the delayed time τ in a delaying unit 6 and is multiplied by a complex number D1 in a weighting unit 14 to generate a delayed component D1*Y(t–τ) based on the influence of the fading and delay. Thereafter, the direct component C0*X(t), the delayed component C1*X(t–τ), the direct component D0*Y(t) and the delayed component D1*Y(t–τ) are summed in an adder 16 to generate a second receiving signal Sb. Therefore, the receiving signals Sa and Sb are generated in a signal generating system 18.

The receiving signals Sa and Sb are expressed according to equations (1) and (2).

$$RA(t)=A0*X(t)+A1*X(t-\tau)+B0*Y(t)+B1*Y(t-\tau) \quad (1)$$

$$RB(t)=C0*X(t)+C1*X(t-\tau)+D0*Y(t)+D1*Y(t-\tau) \quad (2)$$

Here, the symbol RA(t) denotes the first receiving signal Sa, and the symbol RB(t) denotes the second receiving signal Sb. Though the complex numbers A0, A1, B0, B1, C0, C1, D0 and D1 are respectively expressed by a fixed value, the complex numbers are actually time-changed.

FIG. 2 is a block diagram of a first conventional data receiving system for receiving data signals transmitted from the signal generating system shown in FIG. 1.

As shown in FIG. 2, a plurality of first receiving signals Sa are received one after another by an antenna 21, and each signal Sa is multiplied by a first coefficient in a forward tap 23. Also, a plurality of second receiving signals Sb are received one after another by another antenna 22, and each signal Sa is multiplied by a second coefficient in another forward tap 24. Thereafter, the first multiplied signal Sa and the second multiplied signal Sb are summed in an adder 26. In this case, the first and second coefficients independent of each other are adjusted to maximize a level ratio of a desired component composed of the components A0*X(t), A1*X(t–τ), C0*X(t) and C1*X(t–τ) to an interference component composed of the components B0*Y(t), B1*Y(t–τ), D0*Y(t) and D1*Y(t–τ). Therefore, the influence of the interference signal Y(t) is suppressed. Also, to remove the delay components A1*X(t–τ) and C1*X(t–τ) of the desired signal X(t), a delay component generated in a weighting unit 25 is subtracted in the adder 26 from the sum of the first and second multiplied signals Sa and Sb. That is, an output of the adder 26 obtained in a current period is quantized to a series of binary values in an identifying unit 28 to generate a demodulated signal Sx, the demodulated signal Sx is delayed by one symbol time T in a delaying unit 29, the demodulated signal Sx delayed is weighted by a gain in the weighting unit 25, and the demodulated signal Sx delayed and weighted is subtracted from a sum of other first and second multiplied signals Sa and Sb in a succeeding period. Also, the series of binary values of the identifying unit 28 is subtracted from the output of the adder 26 in a subtracting unit 27 to calculate an error Ex. In a first conventional data receiving system 30, the gain of the weighting unit 25, the coefficients of the forward taps 23 and 24 are adjusted to minimize a squared value of the error Ex each time a pair of first and second receiving signals Sa and Sb are received.

Accordingly, the first conventional data receiving system 30 functions as an equalizing unit in which the components B0*Y(t), B1*Y(t−τ), D0*Y(t) and D1*Y(t−τ) relating to the interference signal Y(t) are suppressed and the delay components A1*X(t−τ) and C1*X(t−τ) of the desired signal X(t) are removed, and the demodulated signal Sx relating to the direct components A0*X(t) and C0*X(t) of the desired signal X(t) can be obtained.

FIG. 3 is a block diagram of a second conventional data receiving system for receiving data signals transmitted from the signal generating system shown in FIG. 1.

As shown in FIG. 3, because a diversity reception is performed in a second conventional data receiving system 40, a plurality of first receiving signals Sa are received one after another by an antenna 41, and a plurality of second receiving signals Sb are received one after another by another antenna 42. In a maximum likelihood sequence estimating (MLSE) equalizing unit 60, in cases where a quadri-phase shifting keying (QPSK) method is adopted as a modulation method, four desired conditions are considered for the desired signal X(t) to generate all signals which each are likely received by the antennas 41 and 42 as the desired signal X(t), and four interference conditions are considered for the interference signal Y(t) to generate all signals which each are likely received by the antennas 41 and 42 as the interference signal Y(t). The desired conditions are transmitted one after another in arbitrary order to a first circuit assuming unit 51, a first desired signal reproducing unit 53, a second circuit assuming unit 52 and a second desired signal reproducing unit 54, and the interference conditions are transmitted one after another in arbitrary order to the first circuit assuming unit 51, a first interference signal reproducing unit 55, the second circuit assuming unit 52 and a second interference signal reproducing unit 56. Therefore, there are 16 (4*4) types of combinations of the desired and interference conditions.

In the reproducing unit 53, four types of likely desired signals Xi(t) and Xi(t−τ) (i=1 to 4) are produced one after another according to the desired conditions. Also, four types of complex numbers A0i and A1i which each are likely used in the weighting units 7 and 8 of the signal generating system 18 are assumed in a first circuit assuming unit 51 according to the desired conditions. Thereafter, the likely desired signals Xi(t) and Xi(t−τ) are multiplied by the complex numbers A0i and A1i in a first multiplying unit 47 to generate four types of likely desired signals A0i*Xi(t)+A1i*Xi(t−τ) as replicas of the desired signal A0*X(t)+A1*X(t−τ) considering the influence of the fading and delay. In the same manner, four types of likely interference signals Yj(t) and Yj(t−τ) (j=1 to 4) are produced one after another in the reproducing unit 55 according to the interference conditions, and four types of complex numbers B0j and B1j which each are likely used in the weighting units 9 and 10 of the signal generating system 18 are assumed in the first circuit assuming unit 51 according to the interference conditions. Thereafter, the likely interference signals Yj(t) and Yj(t−τ) are multiplied by the complex numbers B0j and B1j in a second multiplying unit 49 to generate four types of likely interference signals B0j*Yj(t)+B1j*Yj(t−τ) as replicas of the interference signal B0*Y(t)+B1*Y(t−τ) considering the influence of the fading and delay. Thereafter, each of the likely desired signals A0i*Xi(t)+A1i*Xi(t−τ) and each of the likely interference signals B0j*Yj(t)+B1j*Yj(t−τ) are summed in an adder 45 to generate sixteen types of first likely receiving signals RAk(t) (k=1 to 16) one after another, each of the first likely receiving signals RAk(t) is subtracted from a first receiving signal Sa currently received by the antenna 41 in a subtracting unit 43 to obtain sixteen first errors one after another, and each of the first errors is squared in a squaring unit 57 to obtain sixteen first squared values.

In the same manner, four types of likely desired signals Xi(t) and Xi(t−τ) are produced in the reproducing unit 54, four types of complex numbers C0i and C1i which each are likely used in the weighting units 11 and 12 of the signal generating system 18 are assumed in a second circuit assuming unit 52 according to the desired conditions, and the likely desired signals Xi(t) and Xi(t−τ) are multiplied by the complex numbers C0i and C1i in a third multiplying unit 48 to generate four types of likely desired signals C0i*Xi(t)+C1i*Xi(t−τ) as replicas of the desired signal C0*X(t)+C1*X(t−τ) considering the influence of the fading and delay. Also, four types of likely interference signals Yj(t) and Yj(t−τ) are produced in the reproducing unit 56, four types of complex numbers D0j and D1j which each are likely used in the weighting units 13 and 14 of the signal generating system 18 are assumed in the second circuit assuming unit 52 according to the interference conditions, and the likely interference signals Yj(t) and Yj(t−τ) are multiplied by the complex numbers D0j and D1j in a fourth multiplying unit 50 to generate four types of likely interference signals D0j*Yj(t)+D1j*Yj(t−τ) as replicas of the interference signal D0*Y(t)+D1*Y(t−τ) considering the influence of the fading and delay. Thereafter, each of the likely desired signals C0i*Xi(t)+C1i*Xi(t−τ) and each of the likely interference signals D0j*Yj(t)+D1j*Yj(t−τ) are summed in an adder 46 to generate sixteen types of second likely receiving signals RBk(t), each of the second likely receiving signals RBk(t) is subtracted from a second receiving signal Sa currently received by the antenna 42 in a subtracting unit 44 to obtain sixteen second errors, and each of the second errors is squared in a squaring unit 58 to obtain sixteen second squared values.

Thereafter, because the diversity reception is performed, each of the first squared values and each of the second squared values are added in an adder 59 to generate sixteen summed values one after another, and a minimum summed value is selected from the summed values. Therefore, it is ascertained that a likely desired signal Xi(t) and a likely interference signal Yj(t) corresponding to the minimum summed value are appropriate as the desired signal X(t) and the interference signal Y(t). Thereafter, the signals Xi(t) and Yj(t) corresponding to the minimum summed value are output from a second conventional data receiving system 40 as the desired signal X(t) and the interference signal Y(t). Therefore, the desired signal X(t) can be obtained from the first and second receiving signals Sa and Sb.

Accordingly, the adverse influence of the fading and delay modeled in the signal generating system 18 can be reduced, and the deterioration of the desired signal X(t) can be improved.

2.2. PROBLEMS TO BE SOLVED BY THE INVENTION:

However, there are many drawbacks in the first and second conventional data receiving systems 30 and 40 as follows.

In the second conventional data receiving system 40, though the deterioration of the desired signal X(t) can be improved, there is drawbacks that a large volume of calculation is required and it is difficult to adopt the second conventional data receiving system 40.

In the first conventional data receiving system 30, though a volume of calculation is small, the improvement of the desired signal X(t) degraded by the existence of the interference signal Y(t) is inferior to that in the second conventional data receiving system 40. In particular, in cases where the interference wave Y(t) and the delayed interference wave Y(t−τ) exist with the desired signal X(t), the improvement of the desired signal X(t) is considerably inferior to that in the second conventional data receiving system 40.

SUMMARY OF THE INVENTION

An object of the present invention is to provide, with due consideration to the drawbacks of the conventional data receiving systems, a data receiving system in which a small volume of calculation is required, the influence of the interference signal including a delayed interference component is sufficiently removed, a receiving quality for the desired signal is improved, and a frequency utilizing efficiency is improved.

The object is achieved by the provision of a data receiving system, comprising:

a plurality of antennas for respectively receiving a data signal having a desired signal and one or a plurality of interference signals, the number of interference signals being N (N is a natural number), the number of antennas being N+M (M is a natural number, or M is equal to zero in case of N=2), the desired signal being composed of a direct component not delayed in a propagation path for the desired signal and a delay component, and each of the interference signals being composed of a direct component not delayed in another propagation path and a delay component;

a desired signal equalizing unit for removing the direct components of all interference signals and the delay component of the desired signal from the data signals received by all antennas and producing a desired intermediate signal including the delay components of all interference signals;

one or a plurality of interference signal equalizing units, which each correspond to one particular interference signal selected from among all interference signals, for respectively removing the delay component of the particular interference signal, the direct components of (N−1) other interference signals other than the particular interference signal and the direct component of the desired signal from the data signals received by all antennas and producing an interference intermediate signal including the delay components of the (N−1) other interference signals and the delay component of the desired signal, the number of interference signal equalizing units being N;

one or a plurality of desired signal backward taps for removing the delay components of all interference signals from the desired intermediate signal produced by the desired signal equalizing unit to make the desired signal equalizing unit output a demodulated desired signal agreeing with the desired signal, the number of desired signal backward taps being N, and each of the desired signal backward taps corresponding to one interference signal; and one or a plurality of interference signal backward taps, corresponding to each of the interference signal equalizing units, for removing the delay components of the (N−1) other interference signals and the delay component of the desired signal from the interference intermediate signal produced by each of the interference signal equalizing units to make each of the interference signal equalizing units output a demodulated interference signal agreeing with the particular interference signal, the number of interference signal backward taps corresponding to one interference signal equalizing unit being N, and each of the interference signal backward taps corresponding to one of the (N−1) other interference signals or the desired signal.

In the above configuration, a desired signal is transmitted from a desired base station to the data receiving system through a propagation path while being delayed and faded in the propagation path. Also, a plurality of interference signals are undesirably transmitted from a plurality of unrelated base stations to the data receiving system through a plurality of propagation paths while being delayed and faded in the propagation paths. Therefore, a data signal having the desired signal faded and delayed and the interference signals faded and delayed is received in each of the antennas. In this case, the desired signal is composed of a direct component faded and a delay component faded, and each of the interference signals is composed of a direct component faded and a delay component faded.

The direct components of all interference signals and the delay component of the desired signal are removed from the data signals received by all antennas in the desired signal equalizing unit to produce a desired intermediate signal, and the delay components of all interference signals are removed from the desired intermediate signal in the desired signal backward taps. Therefore, a demodulated desired signal agreeing with the desired signal is output from the desired signal equalizing unit in cooperation with the desired signal backward taps.

Also, the delay component of a particular interference signal, the direct components of (N−1) other interference signals other than the particular interference signal and the direct component of the desired signal are removed from the data signals received by all antennas in each of the interference signal equalizing units to produce an interference intermediate signal, and the delay components of the (N−1) other interference signals and the delay component of the desired signal are removed from the interference intermediate signal in the interference signal backward taps corresponding to each of the interference signal equalizing units. Therefore, a demodulated interference signal agreeing with the particular interference signal is output from each of the interference signal equalizing unit in cooperation with the interference signal backward taps.

Accordingly, the influence of the interference signals including delayed interference components can be sufficiently removed from the demodulated desired signal on condition that a volume of calculation required in the data receiving system is small, a receiving quality for the desired signal can be improved, and a frequency utilizing efficiency can be improved.

The object is also achieved by the provision of a data receiving system, comprising:

a plurality of antennas for respectively receiving a data signal having a desired signal and one or a plurality of interference signals, the number of interference signals being N (N is a natural number), and the number of antennas being N+M (M is a natural number, or M is equal to zero in case of N=2);

a desired signal equalizing unit for imperfectly removing all interference signals from the data signals received by all antennas and producing a desired intermediate signal including all interference signals in some degree;

one or a plurality of interference signal equalizing units, which each correspond to one particular interference signal selected from among all interference signals, for respectively and imperfectly removing (N−1) other interference signals other than the particular interference signal and the desired signal from the data signals received by all antennas and producing an interference intermediate signal including the (N−1) other interference signals and the desired signal in some degree, the number of interference signal equalizing units being N;

one or a plurality of desired signal backward taps for producing one or a plurality of replicas of the interference signals in one-to-one correspondence according to one or a plurality of demodulated interference signals output from the interference signal equalizing units and perfectly removing all interference signals from the desired intermediate signal produced by the desired signal equalizing unit to make the desired signal equalizing unit output a demodulated desired signal agreeing with the desired signal, the number of desired signal backward taps being N, and each of the desired signal backward taps corresponding to one interference signal; and one or a plurality of interference signal backward taps, corresponding to each of the interference signal equalizing units, for producing one or a plurality of replicas of the (N−1) other interference signals and the desired signal in one-to-one correspondence according to (N−1) demodulated interference signals output from (N−1) other interference signal equalizing units other than a corresponding interference signal equalizing unit and the demodulated desired signal output from the desired signal equalizing unit and removing the (N−1) other interference signals and the desired signal from the interference intermediate signal produced by each of the interference signal equalizing units to make each of the interference signal equalizing units output one demodulated interference signal agreeing with the particular interference signal, the number of interference signal backward taps corresponding to one interference signal equalizing unit being N, and each of the interference signal backward taps corresponding to one of the (N−1) other interference signals or desired signal.

In the above configuration, a desired signal is transmitted from a desired base station to the data receiving system through a propagation path while being faded in the propagation path without being delayed. Also, a plurality of interference signals are undesirably transmitted from a plurality of unrelated base stations to the data receiving system through a plurality of propagation paths while being faded in the propagation paths without being delayed. Therefore, a data signal having the desired signal faded and the interference signals faded is received in each of the antennas.

All interference signals are almost removed from the data signals received by all antennas in the desired signal equalizing unit to produce a desired intermediate signal, one or a plurality of replicas of the interference signals are produced according to one or a plurality of demodulated interference signals output from the interference signal equalizing units in the desired signal backward taps, all interference signals are perfectly removed from the desired intermediate signal by subtracting the replicas from the desired intermediate signal, and a demodulated desired signal agreeing with the desired signal is output from the desired signal equalizing unit.

Also, (N−1) other interference signals other than a particular interference signal and the desired signal are almost removed from the data signals received by all antennas in each of the interference signal equalizing units to produce an interference intermediate signal, one or a plurality of replicas of the (N−1) other interference signals and the desired signal are produced in the interference signal backward taps relating to a corresponding interference signal equalizing unit according to (N−1) demodulated interference signals output from (N−1) other interference signal equalizing units other than the corresponding interference signal equalizing unit and the demodulated desired signal output from the desired signal equalizing unit, the (N−1) other interference signals and the desired signal are perfectly removed from the interference intermediate signal by subtracting the replicas from the interference intermediate signal, and one demodulated interference signal agreeing with the particular interference signal is output from each of the interference signal equalizing units.

Accordingly, the influence of the interference signals not including delayed interference components can be sufficiently removed from the demodulated desired signal on condition that a volume of calculation required in the data receiving system is small, a receiving quality for the desired signal can be improved, and a frequency utilizing efficiency can be improved.

BRIEF DESCRIPTION OF THE DRAWINGS

The objects, features and advantages of the present invention will be apparent from the following description taken in conjunction with the accompanying drawings, in which.

DETAIL DESCRIPTION OF THE EMBODIMENTS

Preferred embodiments of a data receiving system according to the present invention are described with reference to drawings.

As is described in PREVIOUSLY PROPOSED ART, because the complex numbers A0, A1, B0, B1, C0, C1, D0 and D1 are actually time-changed, complex numbers A, B, C and D changing in dependence on time are expressed as follows.

$$A = A0 + A1 * Z^{-1}$$
$$B = B0 + B1 * Z^{-1}$$
$$C = C0 + C1 * Z^{-1}$$
$$D = D0 + D1 * Z^{-1} \qquad (3)$$

Here, the symbol Z denotes a symbol delay time. Therefore, in cases where a desired signal $S1 = X(t)$ and an interference signal $S2 = Y(t)$ are faded and delayed on a propagation path, a first data signal R1 and a second data signal R2 received by a pair of receiving antennas are expressed as follows.

$$R1 = A * S1 + C * S2$$
$$R2 = B * S1 + D * S2 \qquad (4)$$

(First Embodiment)

Figure 1:
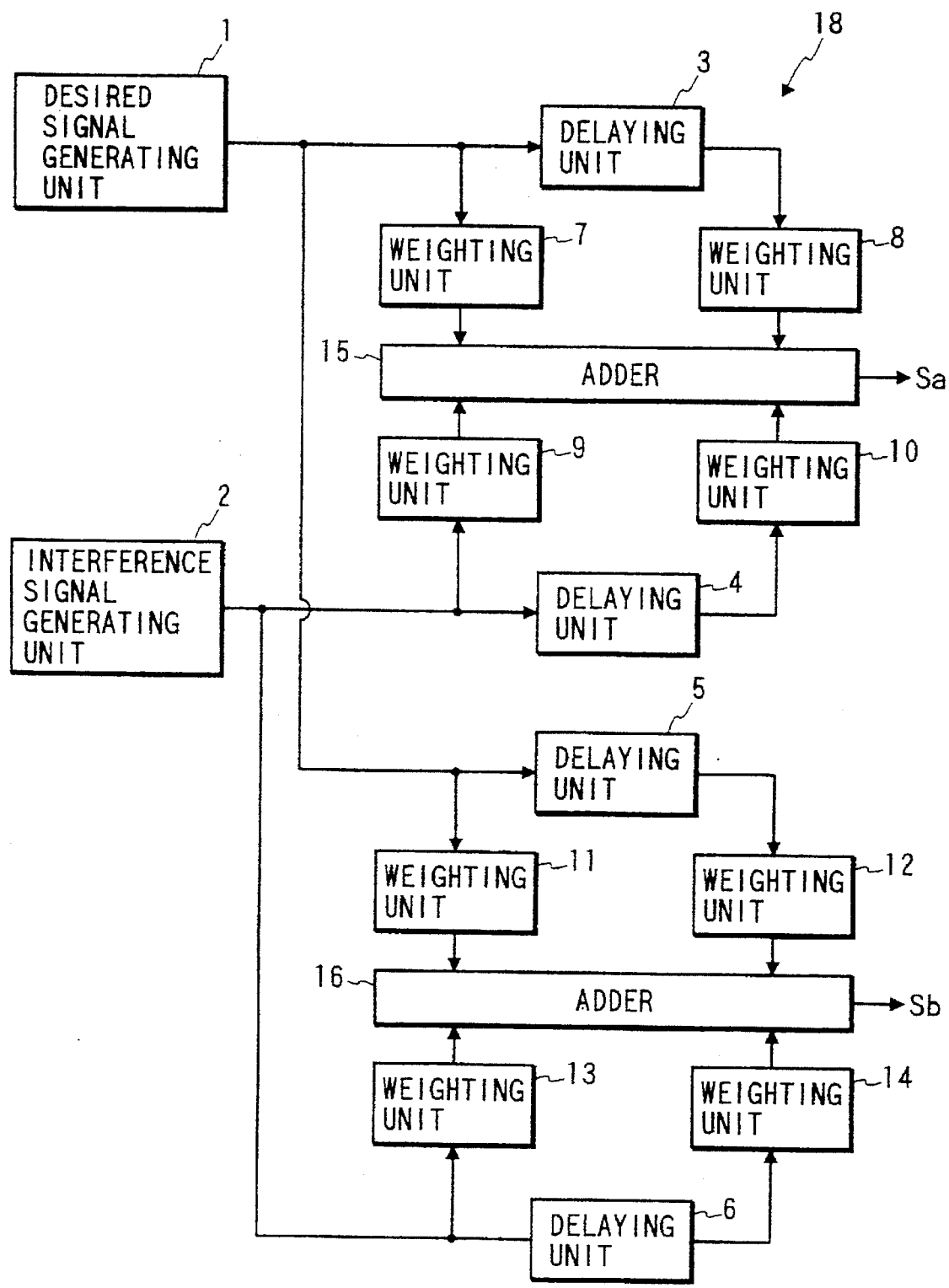
FIG. 1 is a block diagram of a signal generating system.
Figure 2:
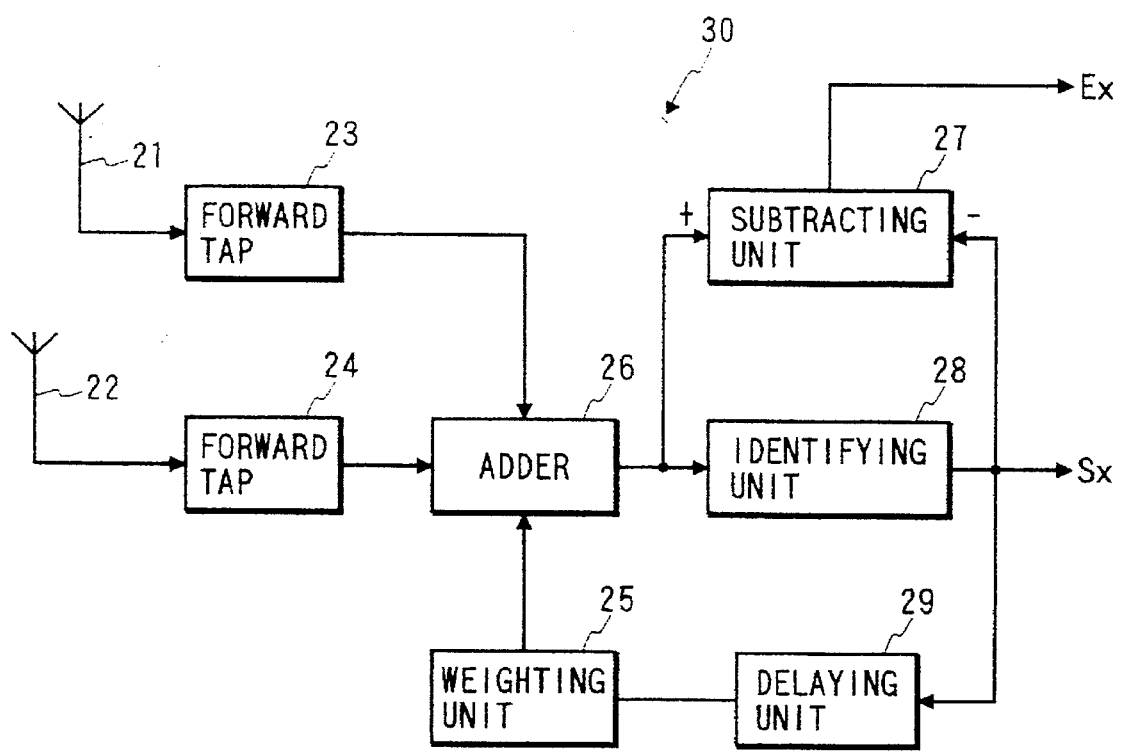
FIG. 2 is a block diagram of a first conventional data receiving system for receiving data signals transmitted from the signal generating system shown in FIG. 1.
Figure 3:
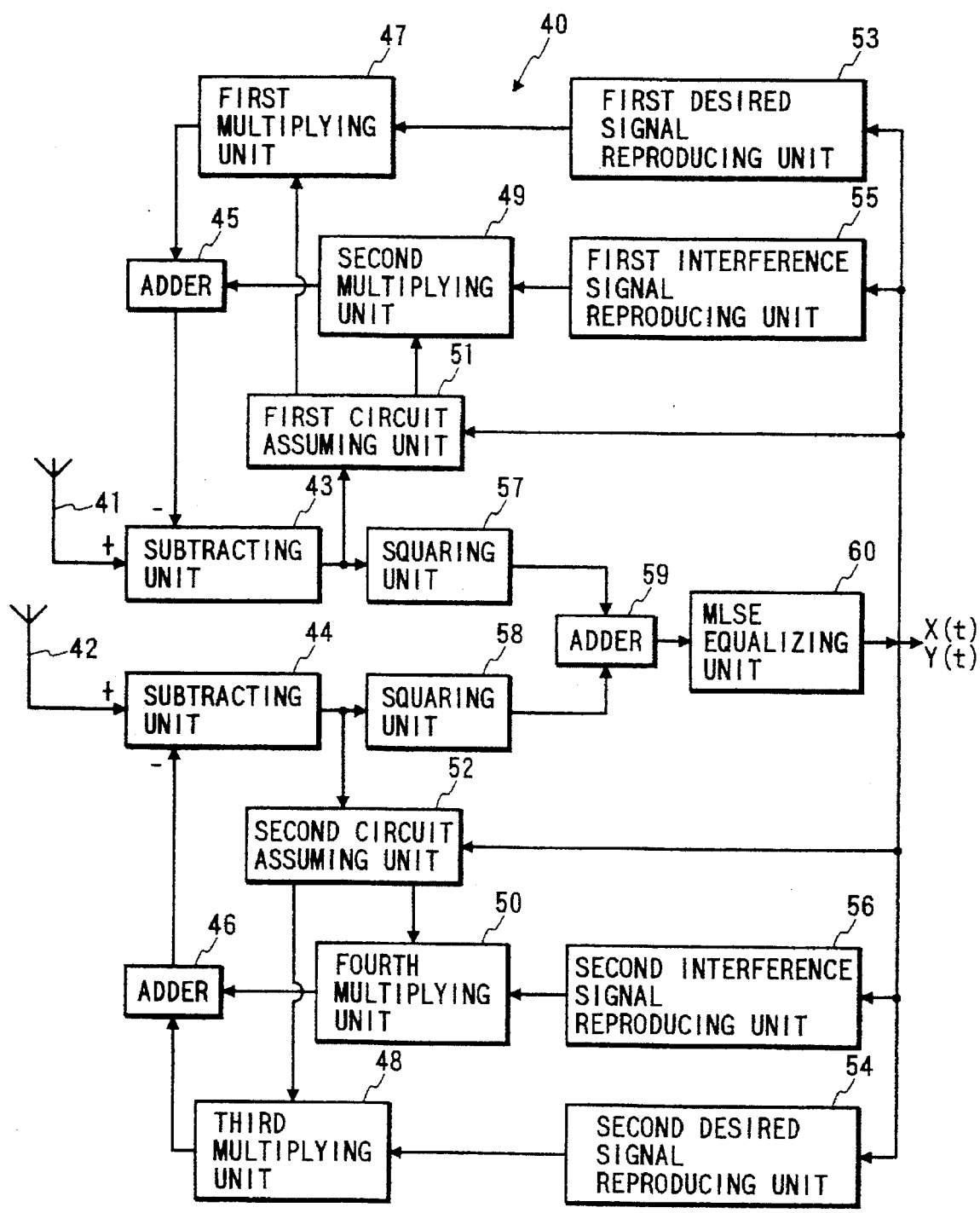
FIG. 3 is a block diagram of a second conventional data receiving system for receiving data signals transmitted from the signal generating system shown in FIG. 1.
Figure 4:
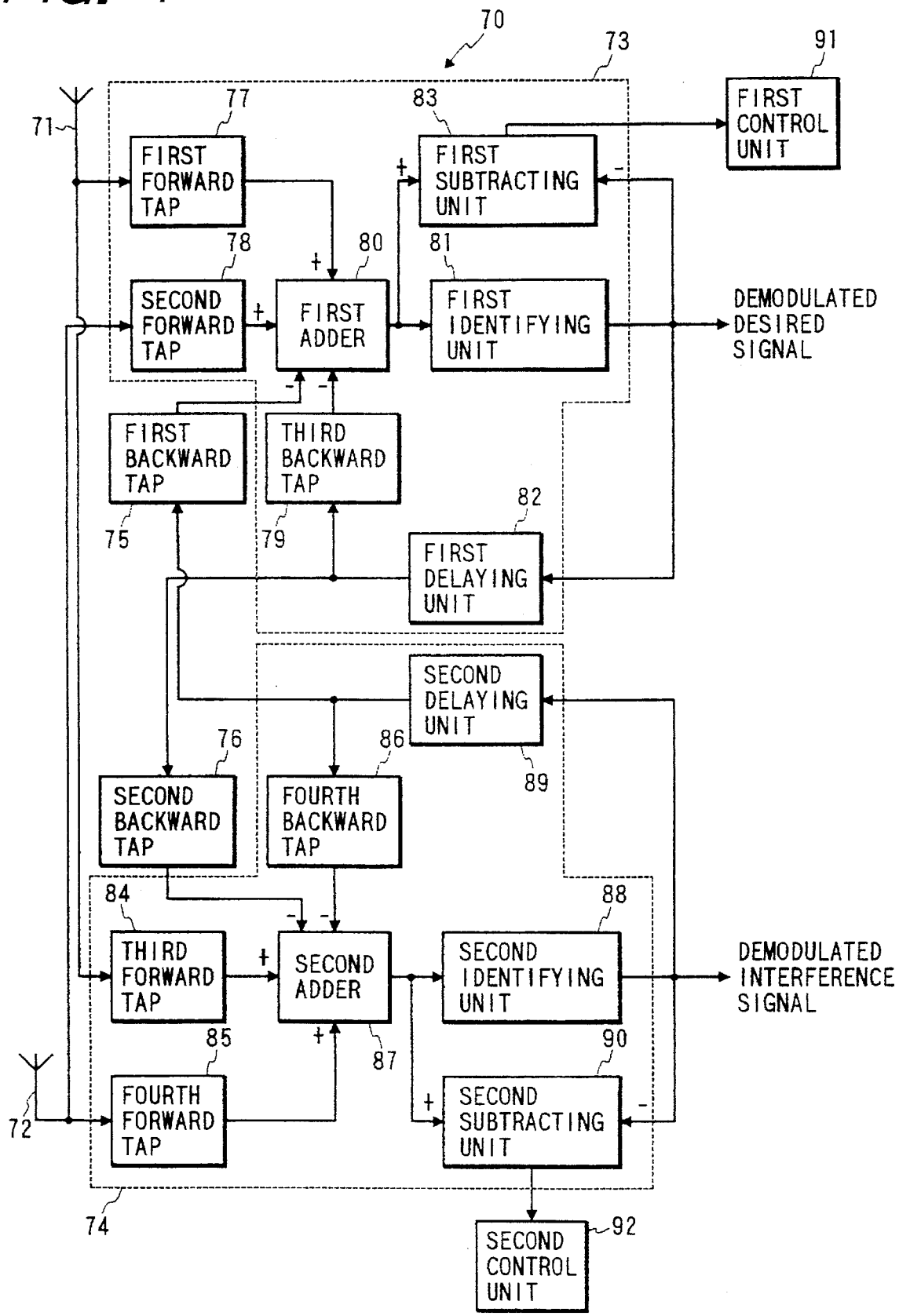
FIG. 4 is a block diagram of a data receiving system for receiving data signals transmitted through a propagation path, according to a first embodiment of the present invention.

FIG. 4 is a block diagram of a data receiving system for receiving the data signals R1 and R2 transmitted through a propagation path, according to a first embodiment of the present invention.

As shown in FIG. 4, a data receiving system 70 comprises a first antenna 71 for receiving the first data signal R1, a second antenna 72 for receiving the second data signal R2, a desired signal equalizing unit 73 for removing a direct component of the interference signal S2 and a delay component of the desired signal S1 from the first and second data signals received by the first and second antennas 71 and 72 to produce a demodulated desired signal, an interference signal equalizing unit 74 for removing a direct component of the interference signal S1 and a delay component of the interference signal S2 from the first and second data signals received by the first and second antennas 71 and 72 to produce a demodulated interference signal, a first backward tap 75 for generating a replica of a delay component of the interference signal S2 by using the demodulated interference signal obtained in the interference signal equalizing unit 74 to remove the delay component of the interference signal S2 from the demodulated desired signal, a second backward tap 76 for generating a delay component of the desired signal S1 by using the demodulated desired signal obtained in the desired signal equalizing unit 73 to remove the delay component of the desired signal S1 from the demodulated interference signal, a first control unit 91 for controlling the desired signal equalizing unit 73 and the first backward tap 75, and a second control unit 92 for controlling the interference signal equalizing unit 74 and the second backward tap 76.

The first backward tap 75 is formed of a weighting unit in which the demodulated interference signal equivalent to the interference signal S2 is weighted by a gain determined by a tap coefficient, and the second backward tap 76 is formed of a weighting unit in which the demodulated desired signal equivalent to the desired signal S1 is weighted by a gain determined by a tap coefficient.

The desired signal equalizing unit 73 comprises a first forward tap 77 for filtering the first data signal R1 received by the first antenna 71 according to a tap coefficient (or a transfer function) controlled by the first control unit 91, a second forward tap 78 for filtering the second data signal R2 received by the second antenna 72 according to a tap coefficient controlled by the first control unit 91, a third backward tap 79 functioning as a weighting unit for generating a replica of the delay component of the desired signal S1 by weighting the demodulated desired signal obtained in the equalizing unit 73 according to a tap coefficient controlled by the first control unit 91, a first adder 80 for adding the first and second data signals R1 and R2 filtered in the forward taps 77 and 78 to remove the direct component of the interference signal S2, subtracting the delay component generated in the third backward tap 79 and subtracting the delay component generated in the first backward tap 75 to produce a first output signal X1, a first identifying unit 81 for outputting a first identified signal Y1 as the demodulated desired signal obtained by quantizing the first output signal X1 sent from the first adder 80 to a series of binary values, a first delaying unit 82 for delaying the first identified signal Y1 by one symbol delay time and outputting the signal Y1 as a first delayed signal, and a first subtracting unit 83 for subtracting the first identified signal Y1 from the first output signal X1 of the first adder 80 to obtain a first error. The first control unit 91 controls the forward taps 77 and 78 and the backward taps 75 and 79 to converge the first error to zero.

The interference signal equalizing unit 74 comprises a third forward tap 84 for filtering the first data signal R1 received by the first antenna 71 according to a tap coefficient controlled by the first control unit 91, a fourth forward tap 85 for filtering the second data signal R2 received by the second antenna 72 according to a tap coefficient controlled by the first control unit 91, a fourth backward tap 86 functioning as a weighting unit for generating a replica of the delay component of the interference signal S2 by weighting the demodulated interference signal obtained in the equalizing unit 74 according to a tap coefficient controlled by the first control unit 91, a second adder 87 for adding the first and second data signals R1 and R2 filtered in the forward taps 84 and 85 to remove the direct component of the desired signal S1, subtracting the delay component generated in the fourth backward tap 86 and subtracting the delay component generated in the second backward tap 76, a second identifying unit 88 for outputting a second identified signal Y2 as the demodulated interference signal obtained by quantizing a second output signal X2 sent from the second adder 87 to a series of binary values, a second delaying unit 89 for delaying the second identified signal Y2 by one symbol delay time and outputting the signal Y2 as a second delayed signal, and a second subtracting unit 90 for subtracting the second identified signal Y2 from the second output signal X2 of the second adder 87 to obtain a second error. The second control unit 92 controls the forward taps 84 and 85 and the backward taps 76 and 86 to converge the second error to zero.

Each of the signal equalizing units 73 and 74 is called a decision-feedback type of equalizer. Each of the forward taps 77, 78, 84 and 85 is formed of a finite-duration impulse-response (FIR) type of filter.

In the above configuration, when a first data signal R1 is received by the first antenna 71 and a second data signal R2 is received by the second antenna 72 in a current operation, the first data signal R1 is filtered in the first and third forward taps 77 and 84, the second data signal R2 is filtered in the second and fourth forward taps 78 and 85, and the first data signal R1 filtered in the forward tap 77 and the second data signal R2 filtered in the second forward tap 78 are summed in the first adder 80. In this case, transfer characteristics of the forward taps 77 and 78 are adjusted to remove the direct component of the interference signal S2 from a sum of the filtered data signals. Therefore, the direct component of the interference signal S2 is removed from a sum of the filtered data signals R1 and R2 in the first adder 80 by the function of the forward taps 77 and 78.

Also, a first identified signal Y1 relating to a pair of data signals R1 and R2 which are received by the antennas 71 and 72 in a previous operation preceding to the current operation by one symbol delay time is stored in the first delaying unit 82, the first identified signal Y1 delayed is output as a first delayed signal to the third backward tap 79, the first delayed signal is weighted in the third backward tap 79 to produce a replica of a delay component of the desired signal S1, and the replica of the delay component of the desired signal S1 is subtracted from the sum of the filtered data signals R1 and R2 in the first adder 80 to produce a desired intermediate signal in the first adder 80. Therefore, the influence of the delay component of the desired signal S1 is suppressed in the desired intermediate signal. The removal of the direct component of the interference signal S2 and the removal of the delay component of the desired signal S1 are performed as a normal function of the decision-feedback type of equalizer.

In addition, a second identified signal Y2 relating to a pair of data signals R1 and R2 received in the previous operation is stored in the second delaying unit 89, the second identified signal Y2 delayed is output as a second delayed signal to the first backward tap 75, the second delayed signal is weighted in the first backward tap 75 to produce a replica of a delay component of the interference signal S2, and the replica of the delay component of the interference signal S2 is subtracted from the desired intermediate signal in the first adder 80 to remove the delay component of the interference signal S2 from a first output signal X1 output from the first adder. Therefore, the adverse influence of the direct component of the interference signal S2, the delay component of the desired signal S1 and the delay component of the interference signal S2 is suppressed in the first adder 80.

Thereafter, the first output signal X1 output from the first adder 80 is changed to a first identified signal newly obtained in the first identifying unit 81, and the first identified signal Y1 is output as the demodulated desired signal. Also, the first identified signal Y1 is stored in the first delaying unit 82 to be used for a succeeding operation. Also, the first identified signal Y1 is subtracted from the first output signal X1 in the first subtracting unit 83 to obtain a first error.

Also, the first data signal R1 filtered in the forward tap 84 and the second data signal R2 filtered in the forward tap 85 are summed in the second adder 87 in parallel with the operation of the desired signal equalizing unit 73 and the first backward tap 75. In this case, transfer characteristics of the forward taps 84 and 85 are adjusted to remove the direct component of the desired signal S1 from a sum of the filtered data signals. Therefore, the direct component of the desired signal S1 is removed from a sum of the filtered data signals R1 and R2 in the second adder 87 by the function of the forward taps 84 and 85.

Also, the second identified signal Y2 relating to the data signals R1 and R2 received in the previous operation is stored in the second delaying unit 89, the second identified signal Y2 delayed is output as the second delayed signal to the fourth backward tap 86, the second delayed signal is weighted in the fourth backward tap 86 to produce a replica of a delay component of the interference signal S2, and the replica of the delay component of the interference signal S2 is subtracted from the sum of the filtered data signals R1 and R2 in the second adder 87 to produce an interference intermediate signal in the second adder 87. Therefore, the delay component of the interference signal S2 is removed from the interference intermediate signal. The removal of the direct component of the desired signal S1 and the removal of the delay component of the interference signal S2 are performed as a normal function of the decision-feedback type of equalizer.

In addition, the first identified signal Y1 relating to the data signals R1 and R2 received in the previous operation is stored in the first delaying unit 82, and the first identified signal Y1 delayed is output as the first delayed signal to the second backward tap 76. Thereafter, the first delayed signal is weighted in the second backward tap 76 to produce a replica of a delay component of the desired signal S1, and the replica of the delay component of the desired signal S1 is subtracted from the interference intermediate signal in the second adder 87 to remove the delay component of the desired signal S1 from a second output signal X2 output from the second adder 87. Therefore, the adverse influence of the direct component of the desired signal S1, the delay component of the interference signal S2 and the delay component of the desired signal S1 is suppressed in the second adder 87.

Thereafter, the second output signal X2 output from the second adder 87 is changed to a second identified signal newly obtained in the second identifying unit 88, and the second identified signal Y2 is output as the demodulated interference signal. Also, the second identified signal Y2 is stored in the second delaying unit 89 to be used for the succeeding operation. Also, the second identified signal Y2 is subtracted from the second output signal X2 in the second subtracting unit 90 to obtain a second error.

Transfer functions set in the forward taps 77, 78, 84 and 85 for adjusting the transfer characteristics of the forward taps are expressed as follows.

$$E=E0+E1*Z^{-1}$$

$$F=F0+F1*Z^{-1}$$

$$G=G0+G1*Z^{-1}$$

$$H=H0+H1*Z^{-1} \qquad (5)$$

Here, E denotes a transfer function of the forward tap 77, F denotes a transfer function of the forward tap 78, G denotes a transfer function of the forward tap 84 and H denotes a transfer function of the forward tap 85.

Transfer functions set in the backward taps 79, 75, 76 and 86 for adding gains are expressed as follows.

$$I=I1*Z^{-1}$$

$$J=J1*Z^{-1}$$

$$K=K1*Z^{-1}$$

$$L=L1*Z^{-1} \qquad (6)$$

Here, I denotes a transfer function of the backward tap 79, J denotes a transfer function of the backward tap 75, K denotes a transfer function of the backward tap 76 and L denotes a transfer function of the backward tap 86.

In cases where the influence of the interference signal and the influence of the delay component of the desired signal are effectively suppressed in the first signal equalizing unit 73 in the previous operation, the demodulated desired signal agreeing with the desired signal S1 is output from the first identifying unit 81. Therefore, the first output signal X1 input to the first identifying unit 81 is expressed as follows.

$$\begin{aligned} X1 &= (A*S1+C*S2)*E+(B*S1+D*S2)*F-S1*I-S2*J \\ &= S1*(A*E+B*F-I)+S2*(C*E+D*F-J) \end{aligned} \quad (7)$$

Also, in cases where the influence of the desired signal and the influence of the delay component of the interference signal are effectively suppressed in the second signal equalizing unit 74 in the previous operation, the demodulated interference signal S2 is output from the second identifying unit 88. Therefore, the second output signal X2 input to the second identifying unit 88 is expressed as follows.

$$\begin{aligned} X2 &= (A*S1+C*S2)*G+(B*S1+D*S2)*H-S1*K-S2*L \\ &= S1*(A*G+B*H-K)+S2*(C*G+D*H-L) \end{aligned} \quad (8)$$

In cases where the transfer functions E, F, G, H, I, J, K and L are converged to satisfy conditions X1=S1 and X2=S2, the influence of the interference signal and the influence of the delay component of the desired signal are effectively suppressed in the first signal equalizing unit 73 in the current operation, and the influence of the desired signal and the influence of the delay component of the interference signal are effectively suppressed in the second signal equalizing unit 74 in the current operation. In other words, in cases where the transfer functions E, F, G, H, I, J, K and L determined by the tap coefficients are adjusted by the first and second control units 91 and 92 to converge the first and second errors obtained in the subtracting units 83 and 90 to zero, the influence of the interference signal and the influence of the delay component of the desired signal are gradually suppressed in the first signal equalizing unit 73, and the influence of the desired signal and the influence of the delay component of the interference signal are gradually suppressed in the second signal equalizing unit 74.

The transfer functions E, F, G, H, I, J, K and L are adjusted by the first and second control units 91 and 92 to satisfy following conditions.

$$A*E+B*F-I=1 \quad (9)$$

$$C*E+D*F-J=0 \quad (10)$$

$$A*G+B*H-K=0 \quad (11)$$

$$C*G+D*H-L=1 \quad (12)$$

Because the delay components of the desired and interference signals are considered, the equation (9) is rewritten.

$$(A0+A1*Z^{-1})*(E0+E1*Z^{-1})+(B0+B1*Z^{-1})*(F0+F1*Z^{-1})-I1*Z^{-1}=1 \quad (13)$$

Therefore, the complex numbers A and B and the transfer functions E, F and I are adjusted as follows.

$$A1*E1+B1*F1=0$$

$$A0*E0+B0*F0=1$$

$$A0*E1+A1*E0+B0*F1+B1*F0=I1 \quad (14)$$

In the same manner, the equations (10) to (12) are rewritten, and the complex numbers and the transfer functions are adjusted as follows.

$$C1*E1+D1*F1=0$$

$$C0*E0+D0*F0=1$$

$$C0*E1+C1*E0+D0*F1+D1*F0=J1$$

$$A1*G1+B1*H1=0$$

$$A0*G0+B0*H0=1$$

$$A0*G1+A1*G0+B0*H1+B1*H0=K1$$

$$C1*G1+D1*H1=0$$

$$C0*G0+D0*H0=1$$

$$C0*G1+C1*G0+D0*H1+D1*H0=L1 \quad (15)$$

The condition that the equations (14) and (15) are satisfied is as follows.

$$E0=D0/M, \ E1=0$$

$$F0=-C0/M, \ F1=0$$

$$G0=-B0/M, \ G1=0$$

$$H0=A0/M, \ H1=0$$

$$I1=(A1*D0-B1*C0)/M$$

$$J1=(C1*D0-D1*C0)/M$$

$$K1=(B1*A0-A1*B0)/M$$

$$L1=(D1*A0-C1*B0)/M \quad (16)$$

Here, the symbol M denotes M=A0*D0−B0*C0.

Because of E1=0, F1=0, G1=0 and H1=0, it is applicable that each of the forward taps E, F, G and H have a single tap.

Accordingly, even though the desired signal S1 composed of the direct component (or non-delay component) and the delay component and the interference signal S2 composed of the direct component and the delay component are received by the antennas 71 and 72, in cases where the eight tap coefficients of the forward and backward taps 77, 78, 84, 85, 79, 75, 76 and 86 are adjusted by the control units 91 and 92 to satisfy the relationship in the equation (16), the adverse influence of the interference signal and the delay component of the desired signal can be perfectly suppressed, and the demodulated desired signal S1 can be obtained.

Also, because the number of tap coefficients (or the number of variables E0, F0, G0, H0, I1, J1, K1 and L1) is only eight, the volume of calculation can be considerably reduced.

Also, a receiving quality for the desired signal can be improved even though the volume of calculation required for the data receiving system 70 is small, and a frequency utilizing efficiency can be improved.

In practical use, because propagation characteristics of the propagation path are unknown, the tap coefficients of the forward and backward taps 77, 78, 84, 85, 79, 75, 76 and 86 are optimized while gradually minimizing the first and second errors.

In the first embodiment, one interference signal composed of one direct component and one delay component is received in the data receiving system 70. However, even though a plurality of interference signals are received, the adverse influence of the interference signals and the delay component of the desired signal can be perfectly suppressed according to the first embodiment. That is, in cases where the number of interference signals is N, the number of antennas is set to N+1, and the number of signal equalizing units is set to N+1. Therefore, the demodulated desired signal is obtained in one signal equalizing unit, and each of the demodulated interference signals is obtained in one of the N signal equalizing units.

Also, even though a plurality of delay components exists in each of the desired and interference signals, the adverse influence of the interference signals and the delay components of the desired signal can be perfectly suppressed according to the first embodiment. That is, in cases where the number of delay components in each of the desired and interference signals is M, M sets of delay circuits which each has one delaying unit and N+1 backward taps are prepared for each of the signal equalizing units.

Also, in cases where a tap distance of the forward taps is set to 1/N0 (N0 is a natural number equal to or higher than 2) of one symbol delay time, a timing difference between the desired and interference signals and a timing difference in synchronization are absorbed. Therefore, the adverse influence of adjacent interference signals can be suppressed.

Also, the diversity reception is performed by using two antennas 71 and 72. However, it is applicable that the number of antennas used for the diversity reception be more than two. In this case, the adverse influence of the fading in the propagation path can be moreover suppressed.

(Second Embodiment)

Figure 5:
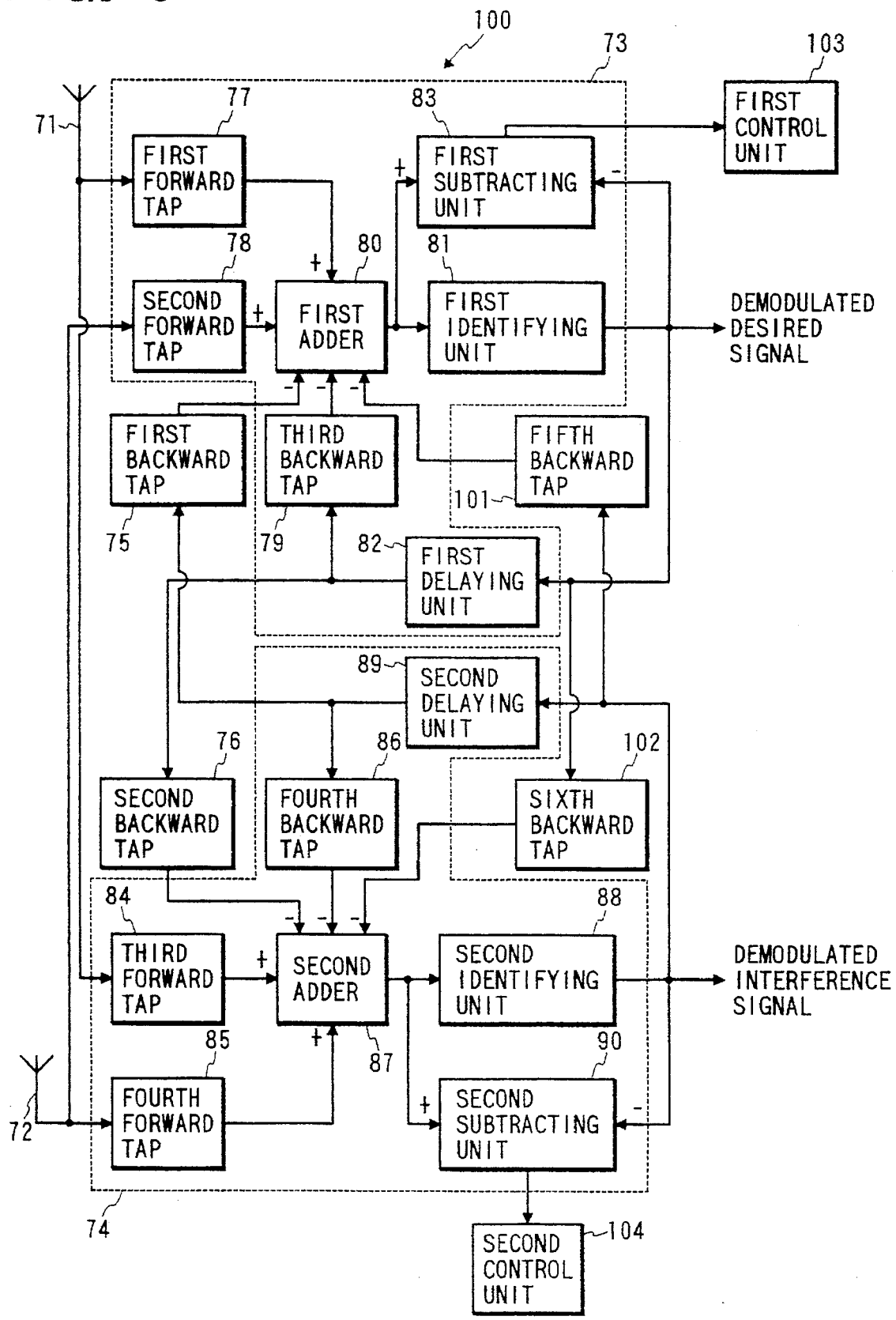
FIG. 5 is a block diagram of a data receiving system for receiving data signals transmitted through a propagation path, according to a second embodiment of the present invention.

FIG. 5 is a block diagram of a data receiving system for receiving the data signals R1 and R2 transmitted through a propagation path, according to a second embodiment of the present invention.

As shown in FIG. 5, a data receiving system 100 comprises the first antenna 71, the second antenna 72, the desired signal equalizing unit 73, the interference signal equalizing unit 74, the first backward tap 75, the second backward tap 76, a fifth backward tap 101 functioning as a weighting unit for weighting the demodulated interference signal obtained in the interference signal equalizing unit 74 according to a tap coefficient and outputting a replica of a direct component of the interference signal S2 to remove the direct component of the interference signal S2 from the first and second data signals in the equalizing unit 73, a sixth backward tap 102 functioning as a weighting unit for weighting the demodulated desired signal obtained in the desired signal equalizing unit 73 according to a tap coefficient and outputting a replica of a direct component of the desired signal S1 to remove the direct component of the desired signal S1 from the first and second data signals in the equalizing unit 74, a first control unit 103 for controlling the forward taps 77 and 78 and the backward taps 75, 79 and 101 to converge the first error to zero, a second control unit 104 for controlling the forward taps 84 and 85 and the backward taps 76, 86 and 102 to converge the second error to zero.

In the above configuration, when a first data signal R1 is received by the first antenna 71 and a second data signal R2 is received by the second antenna 72, the desired signal equalizing unit 73 and the first backward tap 75 are operated, and a first identifying signal is output from the first identifying unit 81 in the same manner as in the first embodiment. In this case, the fifth backward tap 101 is not operated, and the first identifying signal is regarded as a provisional demodulated desired signal. In other words, the first identifying signal is not adopted as a demodulated desired signal agreeing with the desired signal S1. Also, the interference signal equalizing unit 74 and the second backward tap 76 are operated, and a second identifying signal is output from the second identifying unit 88 in the same manner as in the first embodiment. In this case, the sixth backward tap 102 is not operated, and the second identifying signal is regarded as a provisional demodulated interference signal. In other words, the first identifying signal is not adopted as a demodulated interference signal agreeing with the interference signal S2.

After one symbol delay time passes, a repeating processing in which a first operation for outputting the first identifying signal and a second operation for outputting the second identifying signal are repeatedly performed in parallel with each other is performed while operating the fifth and sixth backward taps 101 and 102.

In detail, in the first operation, the desired signal equalizing unit 73 and the first backward tap 75 are operated in the same manner as in the first embodiment by using the second delayed signal output from the second delaying unit 89. Also, the second identified signal Y2 output from the second identifying unit 88 in the second operation is weighted in the fifth backward tap 101 under control of the first control unit 103 to produce a replica of a direct component of the interference signal S2, and the replica of the direct component of the interference signal S2 is subtracted from the sum of the filtered data signals R1 and R2 in the first adder 80 to remove the direct component of the interference signal S2 from the first output signal X1. Thereafter, a first output signal X1 output from the first adder 80 is changed to a first identified signal Y1 in the first identifying unit 81. The first identified signal Y1 is output as a demodulated desired signal. Also, the first identified signal Y1 is stored in the first delaying unit 82. Also, the first identified signal Y1 is subtracted from the first output signal X1 in the first subtracting unit 83 to produce a first error, and the forward taps and the backward taps are adjusted by the first control unit 91 to minimize an absolute value of the first error.

Therefore, because the replica of the direct component of the interference signal S2 is subtracted in the first adder 80, the direct component of the interference signal can be perfectly removed from the first identified signal Y1 in the first operation, and the first identified signal Y1 strictly agrees with the desired signal S1. That is, a probability that the desired signal S1 is correctly obtained is heightened as compared with that in the first embodiment.

In the second operation, the interference signal equalizing unit 74 and the second backward tap 76 are operated in the same manner as in the first embodiment by using the first delayed signal output from the first delaying unit 82. Also, the first identified signal Y1 output from the first identifying unit 81 in the first operation is weighted in the sixth backward tap 102 under control of the second control unit 104 to produce a replica of a direct component of the desired signal S1, and the replica of the direct component of the desired signal S1 is subtracted from the sum of the filtered data signals R1 and R2 in the second adder 87 to remove the direct component of the desired signal S1 from a second output signal X2 output from the second adder 87. Thereafter, the second output signal X2 is changed to a second identified signal Y2 in the second identifying unit 88. The second identified signal Y2 is output as a demodulated interference signal. Also, the second identified signal Y2 is stored in the second delaying unit 89. Also, the second identified signal Y2 is subtracted from the second output signal X2 in the second subtracting unit 90 to produce a second error, and the forward taps and the backward taps are adjusted by the second control unit 92 to minimize an absolute value of the second error.

Therefore, because the replica of the direct component of the desired signal S1 is subtracted in the second adder 87, the direct component of the desired signal can be perfectly removed from the second identified signal Y2 in the second operation, and the second identified signal Y2 strictly agrees with the interference signal S2. That is, a probability that the interference signal S2 is correctly obtained is heightened as compared with that in the first embodiment.

Accordingly, because the direct component of the interference signal S2 is reliably removed from the desired signal S1, a receiving quality for the desired signal can be moreover improved even though the volume of calculation required for the data receiving system 100 is small, and a frequency utilizing efficiency can be improved.

The first and second operations are performed only once or a plurality of times. In cases where the first and second operations are repeated, a probability that the desired signal S1 and the interference signal S2 are correctly obtained is moreover heightened. However, because the first and second error signals are not changed even though the first and second operations are repeated more than several times, one or two repetition times is preferable.

In practical use, because propagation characteristics of the propagation path are unknown, the tap coefficients of the forward and backward taps 77, 78, 84, 85, 79, 75, 76, 86, 101 and 102 are optimized while gradually minimizing the first and second errors.

In the second embodiment, one interference signal composed of one direct component and one delay component is received in the data receiving system 100. However, even though a plurality of interference signals are received, the adverse influence of the interference signals and the delay component of the desired signal can be perfectly suppressed according to the second embodiment. That is, in cases where the number of interference signals is N, the number of signal equalizing units is set to N+1. Therefore, the demodulated desired signal is obtained in one signal equalizing unit, and each of the demodulated interference signals is obtained in one of the N signal equalizing units.

Also, even though a plurality of delay components exists in each of the desired and interference signals, the adverse influence of the interference signals and the delay components of the desired signal can be perfectly suppressed according to the second embodiment. That is, in cases where the number of delay components in each of the desired and interference signals is M, M sets of delay circuits which each has one delaying unit and N+1 backward taps are prepared for each of the signal equalizing units.

Also, in cases where a tap distance of the forward taps is set to 1/N0 (N0 is a natural number equal to or higher than 2) of one symbol delay time, a timing difference between the desired and interference signals and a timing difference in synchronization are absorbed. Therefore, the adverse influence of adjacent interference signals can be suppressed.

Also, the diversity reception is performed by using two antennas 71 and 72. However, it is applicable that the number of antennas used for the diversity reception be more than two. In this case, the adverse influence of the fading in the propagation path can be moreover suppressed.
(Third Embodiment)

Figure 6:
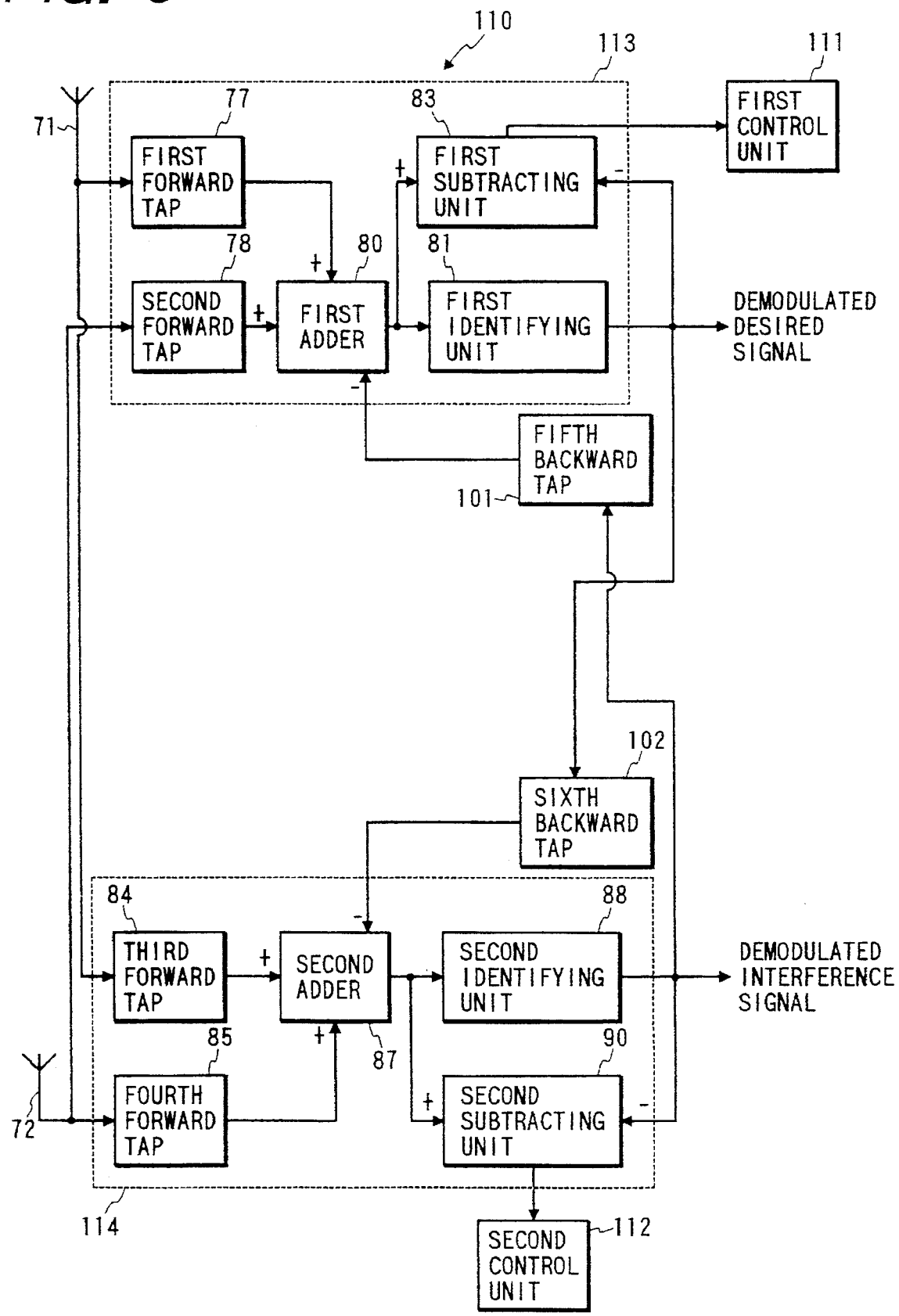
FIG. 6 is a block diagram of a data receiving system for receiving data signals in which no delay component exists, according to a third embodiment of the present invention.

FIG. 6 is a block diagram of a data receiving system for receiving the data signals R1 and R2 in which no delay component exists (A1=B1=C1=D1=0 in the equation (3)), according to a third embodiment of the present invention.

As shown in FIG. 6, a data receiving system 110 comprises the first antenna 71 for receiving the first data signal R1 having no delay component, the second antenna 72 for receiving the second data signal R2 having no delay component, the forward taps 77 and 78, the first adder 80, the first identifying unit 81, the first subtracting unit 83, the forward taps 84 and 85, the second adder 87, the second identifying unit 88, the second subtracting unit 90, the fifth bacbard tap 101, the sixth backward tap 102, a first control unit 111 for controlling the forward taps 77 and 78 and the backward tap 101 to converge the first error to zero, and a second control unit 112 for controlling the forward taps 84 and 85 and the backward tap 102 to converge the second error to zero.

A desired signal equalizing unit 113 classified as a linear equalizing unit is composed of the forward taps 77 and 78, the first adder 80, the first identifying unit 81 and the first subtracting unit 83, and an interference signal equalizing unit 114 classified as the linear equalizing unit is composed of the forward taps 84 and 85, the second adder 87, the second identifying unit 88 and the second subtracting unit 90.

In the above configuration, when a first data signal R1 having no delay component is received by the first antenna 71 and a second data signal R2 having no delay component is received by the second antenna 72, a first operation in which the desired signal equalizing unit 113 and the backward tap 101 are operated and a second operation in which the interference signal equalizing unit 114 and the backward tap 102 are operated are performed in parallel with each other.

That is, in the first operation, the first data signal R1 is filtered in the first forward tap 77, the second data signal R2 is filtered in the second forward tap 78, and the first data signal R1 filtered in the forward tap 77 and the second data signal R2 filtered in the second forward tap 78 are summed in the first adder 80 to suppress the adverse influence of the direct component of the interference signal S2 from a sum of the filtered data signals R1 and R2. Also, the second identified signal Y2 output from the second identifying unit 88 in the second operation is weighted in the fifth backward tap 101 under control of the first control unit 111 to produce a replica of a direct component of the interference signal S2, and the replica of the direct component of the interference signal S2 is subtracted from the sum of the filtered data signals R1 and R2 in the first adder 80 to remove the direct component of the interference signal S2 from a first output signal X1 output from the first adder 80. Thereafter, the first output signal X1 is changed to a first identified signal Y1 in the the first identifying unit 81. The first identified signal Y1 is output as a demodulated desired signal. Also, the first identified signal Y1 is subtracted from the first output signal X1 in the first subtracting unit 83 to produce a first error, and the forward taps 77 and 78 and the backward tap 81 are adjusted by the first control unit 111 to minimize an absolute value of the first error.

In the second operation, the first data signal R1 is filtered in the third forward tap 84, the second data signal R2 is filtered in the fourth forward tap 85, and the first data signal R1 filtered in the forward tap 84 and the second data signal R2 filtered in the second forward tap 85 are summed in the second adder 87 to suppress the adverse influence of the direct component of the desired signal S1 from a sum of the filtered data signals R1 and R2. Also, the first identified signal Y1 output from the first identifying unit 81 in the first operation is weighted in the sixth backward tap 102 under control of the second control unit 112 to produce a replica of a direct component of the desired signal S1, and the replica of the direct component of the desired signal S1 is subtracted from the sum of the filtered data signals R1 and R2 in the second adder 87 to remove the direct component of the desired signal S1 from a second output signal X2 output from the second adder 87. Thereafter, the second output signal X2 is changed to a second identified signal Y2 in the second identifying unit 88. The second identified signal Y2 is output as a demodulated interference signal. Also, the second identified signal Y2 is subtracted from the second output signal X2 in the second subtracting unit 90 to produce a second error, and the forward taps 84 and 85 and the backward tap 102 are adjusted by the second control unit 112 to minimize an absolute value of the second error.

Accordingly, in cases where each of the data signals S1 and S2 has no delay component (R1=A0*S1+C0*S2, R2=B0*S1+D0*S2), the adverse influence of the interference signal S2 can be suppressed in the demodulated desired signal. Also, because the number of taps is only six, the volume of calculation required in the data receiving system 110 can be considerably reduced. Also, even though conditions of the propagation path change, because the number of taps is small, the demodulated desired signal agreeing with the desired signal S1 can be immediately obtained.

In practical use, because propagation characteristics of the propagation path are unknown, the tap coefficients of the forward and backward taps 77, 78, 84, 85, 101 and 102 are optimized while gradually minimizing the first and second errors.

In the third embodiment, one interference signal is received in the data receiving system 110. However, even though a plurality of interference signals respectively having no delay component are received, the adverse influence of the interference signals can be perfectly suppressed according to the third embodiment. That is, in cases where the number of interference signals is N, the number of signal equalizing units is set to N+1. Therefore, the demodulated desired signal is obtained in one signal equalizing unit, and each of the demodulated interference signals is obtained in one of the N signal equalizing units.

Also, in cases where a tap distance of the forward taps is set to 1/M (M is a natural number equal to or higher than 2) of one symbol delay time, a timing difference between the desired and interference signals and a timing difference in synchronization are absorbed. Therefore, the adverse influence of adjacent interference signals can be suppressed.

Also, the diversity reception is performed by using two antennas 71 and 72. However, it is applicable that the number of antennas used for the diversity reception be more than two. In this case, the adverse influence of the fading in the propagation path can be moreover suppressed.

(Fourth Embodiment)

Figure 7:
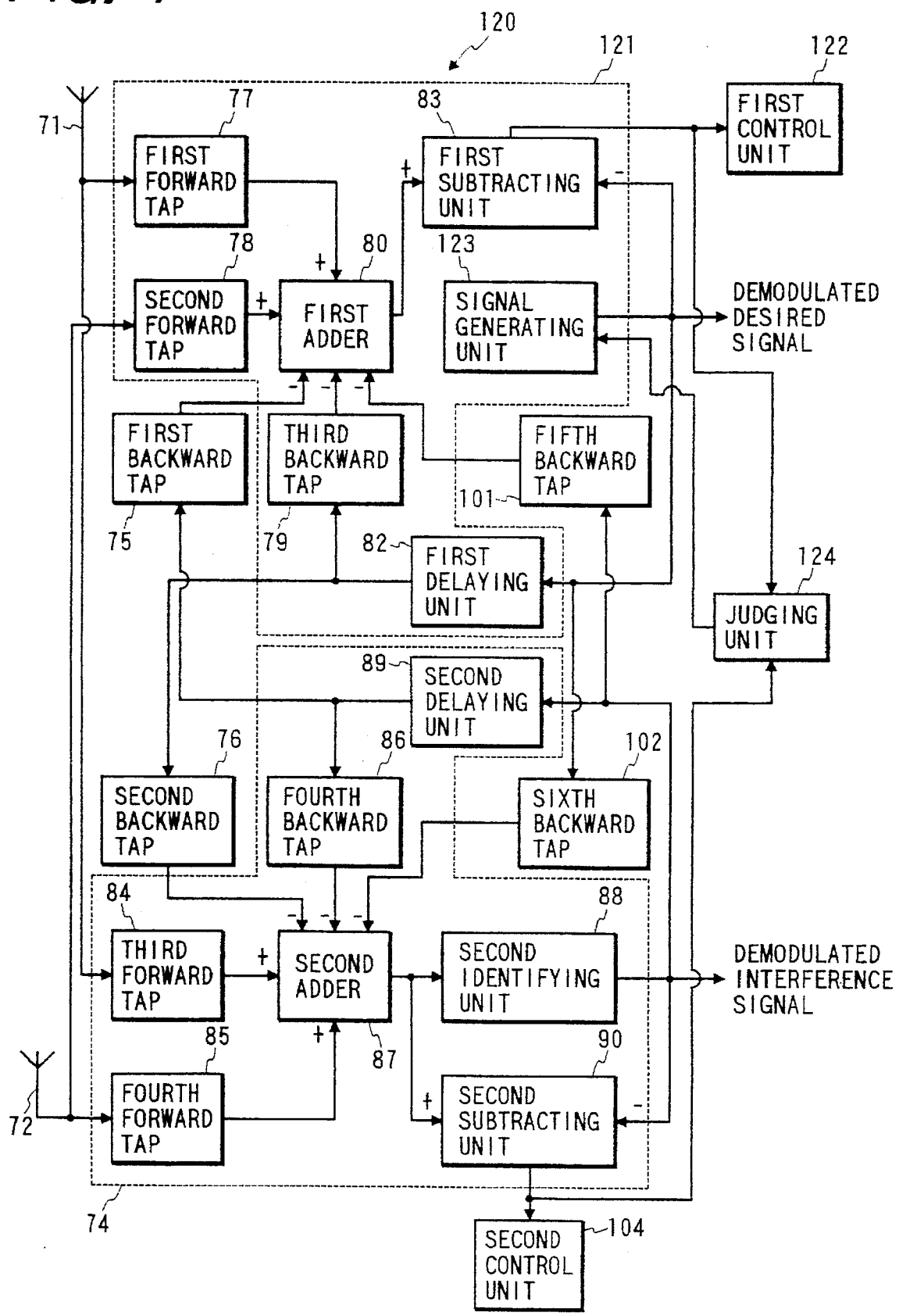
FIG. 7 is a block diagram of a data receiving system for receiving data signals transmitted through a propagation path, according to a fourth embodiment of the present invention.

FIG. 7 is a block diagram of a data receiving system for receiving the data signals R1 and R2 transmitted through a propagation path, according to a fourth embodiment of the present invention.

As shown in FIG. 7, a data receiving system 120 comprises the first antenna 71, the second antenna 72, a desired signal equalizing unit 121 for producing a candidate for the desired signal S1 and a first error, the interference signal equalizing unit 74, the first backward tap 75, the second backward tap 76, the fifth backward tap 101, the sixth backward tap 102, a first control unit 122 for controlling the desired signal equalizing unit 121 and the backward taps 75 and 101, and the second control unit 104.

The desired signal equalizing unit 121 classified as a modified decision-feedback type of equalizer comprises the forward taps 77 and 78, the backward tap 79, the first adder 80, a signal generating unit 123 for generating a plurality of assumptive desired signals which each agree with the desired signal S1 received by the antennas 77 and 78 at some likelihood, the first delaying unit 82 for delaying each of the assumptive desired signals by one symbol delaying time and outputting each assumptive desired signal as a first delayed signal, and the first subtracting unit 83 for subtracting each of the assumptive desired signals from a first output signal X1 output from the first adder 80 to produce a first error. Tap coefficients of the forward taps 77 and 78 and the backward tap 79 are adjusted by the first control unit 122 to minimize a first error of the first subtracting unit 83.

The data receiving system 120 further comprises a judging unit 124 for judging which of the assumptive desired signals agrees with the desired signal S1 according to the first and second errors minimized by the first and second control units 122 and 104.

Because candidates for the desired signal S1 are determined in cases where a demodulation method is determined. For example, in cases where a quadri-phase shifting keying (QPSK) method is adopted as a modulation method, there are four candidates for the desired signal S1. In the fourth embodiment, a plurality of assumptive desired signals respectively agreeing with the desired signal S1 at some likelihood are output from the signal generating unit 123 one after another.

In the above configuration, when a first data signal R1 is received by the first antenna 71 and a second data signal R2 is received by the second antenna 72, a first operation in which the desired signal equalizing unit 121 and the backward taps 75 and 101 are operated under control of the first control unit 122 and a second operation in which the interference signal equalizing unit 74 and the backward taps 76 and 102 are operated under control of the second control unit 104 are performed in parallel with each other.

When the data signals R1 and R2 are received by the antennas 71 and 72, a first assumptive desired signal agreeing with the desired signal S1 at some likelihood is initially output from the signal generating unit 123 as a candidate for the desired signal S1.

In the second operation, the first data signal R1 filtered in the forward tap 84 and the second data signal R2 filtered in the forward tap 85 are summed in the second adder 87, a second delayed signal previously stored in the second storing unit 89 is weighted by the backward tap 86 to produce a replica of a delay component of the interference signal S2, and the replica of the delay component of the interference signal S2 is subtracted from the sum of the filtered data signals R1 and R2 in the second adder 87 in the same manner as in the first embodiment. Therefore, the influence of the delay component of the interference signal S2 is suppressed. Also, an assumptive desired signal previously output from the signal generating unit 123 is stored in the first storing unit 82, a first delayed signal obtained from the assumptive desired signal in the unit 82 is weighted by the backward tap 76 to produce a replica of a delay component of the desired signal S1, and the replica of the delay component of the desired signal S1 is subtracted from the sum of the filtered data signals R1 and R2 in the second adder 87. Therefore, the influence of the delay component of the desired signal S1 is suppressed. Also, the first assumptive desired signal output from the signal generating unit 123 is weighted by the sixth backward tap 102 to produce a replica of a direct component of the desired signal S1, and the replica of the direct component of the desired signal S1 is subtracted from the sum of the filtered data signals R1 and R2 in the second adder 87. Therefore, the influence of the direct component of the desired signal S1 is suppressed. Thereafter, a second output signal X2 output from the second adder 87 is changed to a second identified signal Y2 in the second identifying unit 88. The second identified signal Y2 is output as a demodulated interference signal. Also, the second identified signal Y2 is stored in the second delaying unit 89. Also, the second identified signal Y2 is subtracted from the second output signal X2 in the second subtracting unit 90 to produce a second error, and the forward taps 84 and 85 and the backward taps 76, 86 and 102 are adjusted by the second control unit 104 to minimize an absolute value of the second error.

Therefore, in cases where the first assumptive desired signal agrees with the desired signal S1, the second error is minimized, the direct and delay components of the desired signal S1 can be perfectly removed from the demodulated interference signal, and the demodulated interference signal agrees with the interference signal S2 at high probability.

In the first operation, the first data signal R1 filtered in the forward tap 77 and the second data signal R2 filtered in the forward tap 78 are summed in the first adder 80, the first delayed signal previously stored in the first storing unit 82 is weighted by the backward tap 79 to produce a replica of a delay component of the desired signal S1, and the replica of the delay component of the desired signal S1 is subtracted from the sum of the filtered data signals R1 and R2 in the first adder 80. Therefore, the influence of the delay component of the desired signal S1 is suppressed. Also, the second delayed signal output from the second delaying unit 89 is weighted by the backward tap 75 to produce a replica of a delay component of the interference signal S2, and the replica of the delay component of the interference signal S2 is subtracted from the sum of the filtered data signals R1 and R2 in the first adder 80. Therefore, the influence of the delay component of the interference signal S2 is suppressed. Also, the second identified signal Y2 output from the second identifying unit 88 is weighted by the fifth backward tap 101 to produce a replica of a direct component of the interference signal S2, and the replica of the direct component of the interference signal S2 is subtracted from the sum of the filtered data signals R1 and R2 in the first adder 80. Therefore, the influence of the direct component of the interference signal S2 is suppressed, and a first output signal X1 is produced in the first adder 80. Thereafter, the first assumptive desired signal output from the signal generating unit 123 is stored in the first delaying unit 82. Also, the first assumptive desired signal is subtracted from the first output signal X1 output from the first adder 80 to produce a first error, and the forward taps 77 and 78 and the backward taps 75, 79 and 101 are adjusted by the first control unit 122 to minimize an absolute value of the first error.

Therefore, in cases where the first assumptive desired signal agrees with the desired signal S1, the demodulated interference signal agrees with the interference signal S2, the direct and delay components of the interference signal S2 and the delay component of the desired signal S1 can be perfectly removed in the first adder 80, and the first error is minimized. That is, whether or not an assumptive desired signal output from the signal generating unit 123 agrees with the desired signal S1 can be judged by checking the first error and/or second error.

Thereafter, a second assumptive desired signal agreeing with the desired signal S1 at some likelihood is output from the signal generating unit 123 as another candidate for the desired signal S1, and the first and second operations are again performed in the same manner. That is, the first and second operations are performed each time an assumptive desired signal is output from the signal generating unit 123 until all assumptive desired signals respectively agreeing with the desired signal S1 at some likelihood are output from the signal generating unit 123.

Thereafter, a sum of a squared first error and a squared second error is calculated in the judging unit 124 for each of the assumptive desired signals, a particular assumptive desired signal relating to a minimum sum among the sums is selected, and it is judged by the judging unit 124 that the particular assumptive desired signal agrees with the desired signal S1. Thereafter, the particular assumptive desired signal is always output from the signal generating unit 123.

Accordingly, there is no probability that the desired signal S1 and the interference signal S2 are not immediately demodulated because the desired signal S1 and the interference signal S2 are erroneously assumed in an initial operation. Therefore, the desired signal S1 and the interference signal S2 can be rapidly demodulated or assumed at high probability as compared with that in the second embodiment.

In practical use, because propagation characteristics of the propagation path are unknown, the tap coefficients of the forward and backward taps 77, 78, 84, 85, 79, 75, 76, 86, 101 and 102 are optimized while gradually minimizing the first and second errors.

In the fourth embodiment, one interference signal composed of one direct component and one delay component is received in the data receiving system 100. However, even though a plurality of interference signals are received, the adverse influence of the interference signals and the delay component of the desired signal can be perfectly suppressed according to the fourth embodiment. That is, in cases where the number of interference signals is N, the number of signal equalizing units is set to N+1. Therefore, an assumptive desired signal agreeing with the desired signal can be determined in one signal equalizing unit, and each of the demodulated interference signals is obtained in one of the N signal equalizing units.

Also, even though a plurality of delay components exists in each of the desired and interference signals, the adverse influence of the interference signals and the delay components of the desired signal can be perfectly suppressed according to the fourth embodiment. That is, in cases where the number of delay components in each of the desired and interference signals is M, M sets of delay circuits which each has one delaying unit and N+1 backward taps are prepared for each of the signal equalizing units.

Also, in cases where a tap distance of the forward taps is set to 1/N0 (N0 is a natural number equal to or higher than 2) of one symbol delay time, a timing difference between the desired and interference signals and a timing difference in synchronization are absorbed. Therefore, the adverse influence of adjacent interference signals can be suppressed.

Also, the diversity reception is performed by using two antennas 71 and 72. However, it is applicable that the number of antennas used for the diversity reception be more than two. In this case, the adverse influence of the fading in the propagation path can be moreover suppressed.

(Fifth Embodiment)

Figure 8:
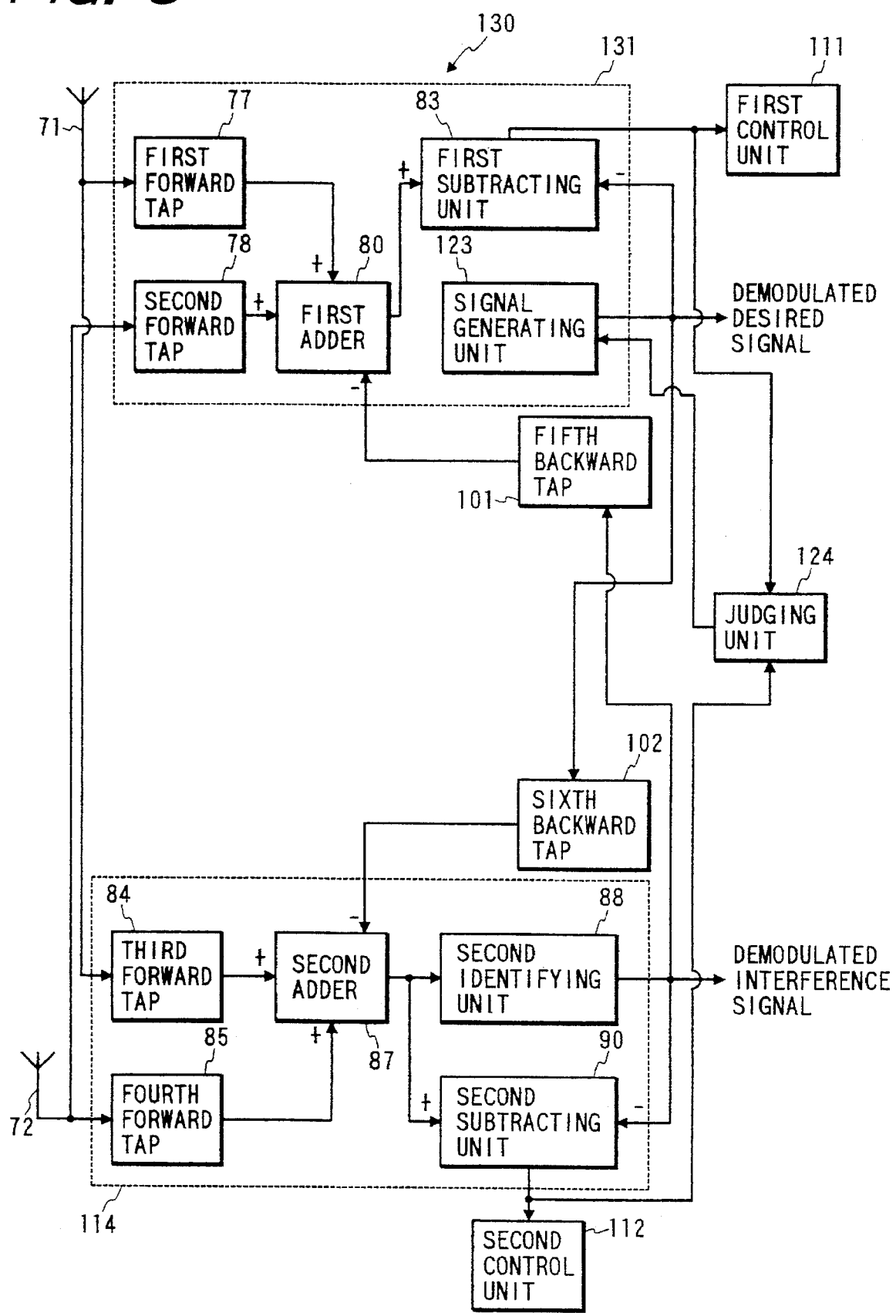
FIG. 8 is a block diagram of a data receiving system for receiving data signals in which no delay component exists, according to a fifth embodiment of the present invention.

FIG. 8 is a block diagram of a data receiving system for receiving the data signals R1 and R2 in which no delay component exists (A1=B1=C1=D1=0 in the equation (3)), according to a fifth embodiment of the present invention.

As shown in FIG. 8, a data receiving system 130 comprises the first antenna 71 for receiving the first data signal R1 having no delay component, the second antenna 72 for receiving the second data signal R2 having no delay component, the forward taps 77 and 78, the first adder 80, the signal generating unit 123, the first subtracting unit 83, the forward taps 84 and 85, the second adder 87, the second identifying unit 88, the second subtracting unit 90, the fifth backward tap 101, the sixth backward tap 102, the first control unit 111, the second control unit 112, and the judging unit 124.

A desired signal equalizing unit 131 classified as a modified linear equalizing unit comprises the forward taps 77 and 78, the first adder 80, the signal generating unit 123 and the first subtracting unit 83.

In the above configuration, each time an assumptive desired signal is generated in the signal generating unit 123, the assumptive desired signal is weighted in the sixth backward trap 102 in the same manner as in the fourth embodiment, the data signals R1 and R2 filtered in the forward taps 84 and 85 are summed in the second adder 87, the assumptive desired signal weighted is subtracted from the sum of the filtered data signals in the second adder 87 to produce a second output signal X2, and the second output signal X2 output from the second adder 87 is changed to a second identified signal Y2 in the second identifying unit 88. The second identified signal Y2 is output as a demodulated interference signal. Also, the second identified signal Y2 is subtracted from the second output signal X2 in the second subtracting unit 90 to produce a second error, and the forward taps 84 and 85 and the backward tap 102 are adjusted by the second control unit 112 to minimize an absolute value of the second error.

Also, each time an assumptive desired signal is generated in the signal generating unit 123, the data signals R1 and R2 filtered in the forward taps 77 and 78 are summed in the first adder 80, the second identified signal Y2 is weighted by the fifth backward tap 101, the second identified signal Y2 weighted is subtracted from the sum of the filtered data signals in the first adder 80 to produce a first output signal X1, the assumptive desired signal is subtracted from the first output signal X1 in the first subtracting unit 83 to produce a first error, and the forward taps 77 and 78 and the backward tap 101 are adjusted by the first control unit 111 to minimize an absolute value of the first error.

After all assumptive desired signals are output from the signal generating unit 123, a particular assumptive desired signal agreeing with the desired signal S1 is determined by the judging unit 124 in the same manner as in the fourth embodiment, and the particular assumptive desired signal is always output from the signal generating unit 123.

Accordingly, in cases where the particular assumptive desired signal agreeing with the desired signal S1 is always output from the signal generating unit 123 on condition that each of the data signals S1 and S2 received by the antennas 71 and 72 has no delay component (R1=A0*S1+C0*S2, R2=B0*S1+D0*S2), the direct component of the desired signal S1 can be perfectly removed from the demodulated interference signal, and the demodulated interference signal agrees with the interference signal S2. Also, the particular assumptive desired signal agreeing with the desired signal S1 is output as a demodulated desired signal S1.

Also, because the number of taps is only six, the volume of calculation required in the data receiving system 130 can be considerably reduced. Also, even though conditions of the propagation path change, because the number of taps is small, the particular assumptive desired signal agreeing with the desired signal S1 can be immediately determined.

Also, there is no probability that the desired signal S1 and the interference signal S2 are not immediately demodulated because the desired signal S1 and the interference signal S2 are erroneously assumed in an initial operation. Therefore, the desired signal S1 and the interference signal S2 can be rapidly demodulated or assumed at high probability as compared with that in the third embodiment.

In practical use, because propagation characteristics of the propagation path are unknown, the tap coefficients of the forward and backward taps 77, 78, 84, 85, 101 and 102 are optimized while gradually minimizing the first and second errors.

In the fifth embodiment, one interference signal is received in the data receiving system 130. However, even though a plurality of interference signals respectively having no delay component are received, the adverse influence of the interference signals can be perfectly suppressed according to the fifth embodiment. That is, in cases where the number of interference signals is N, the number of signal equalizing units is set to N+1. Therefore, the demodulated desired signal is obtained in one signal equalizing unit, and each of the demodulated interference signals is obtained in one of the N signal equalizing units.

Also, in cases where a tap distance of the forward taps is set to 1/M (M is a natural number equal to or higher than 2) of one symbol delay time, a timing difference between the desired and interference signals and a timing difference in synchronization are absorbed. Therefore, the adverse influence of adjacent interference signals can be suppressed.

Also, the diversity reception is performed by using two antennas 71 and 72. However, it is applicable that the number of antennas used for the diversity reception be more than two. In this case, the adverse influence of the fading in the propagation path can be moreover suppressed.

(Sixth Embodiment)

Figure 9:
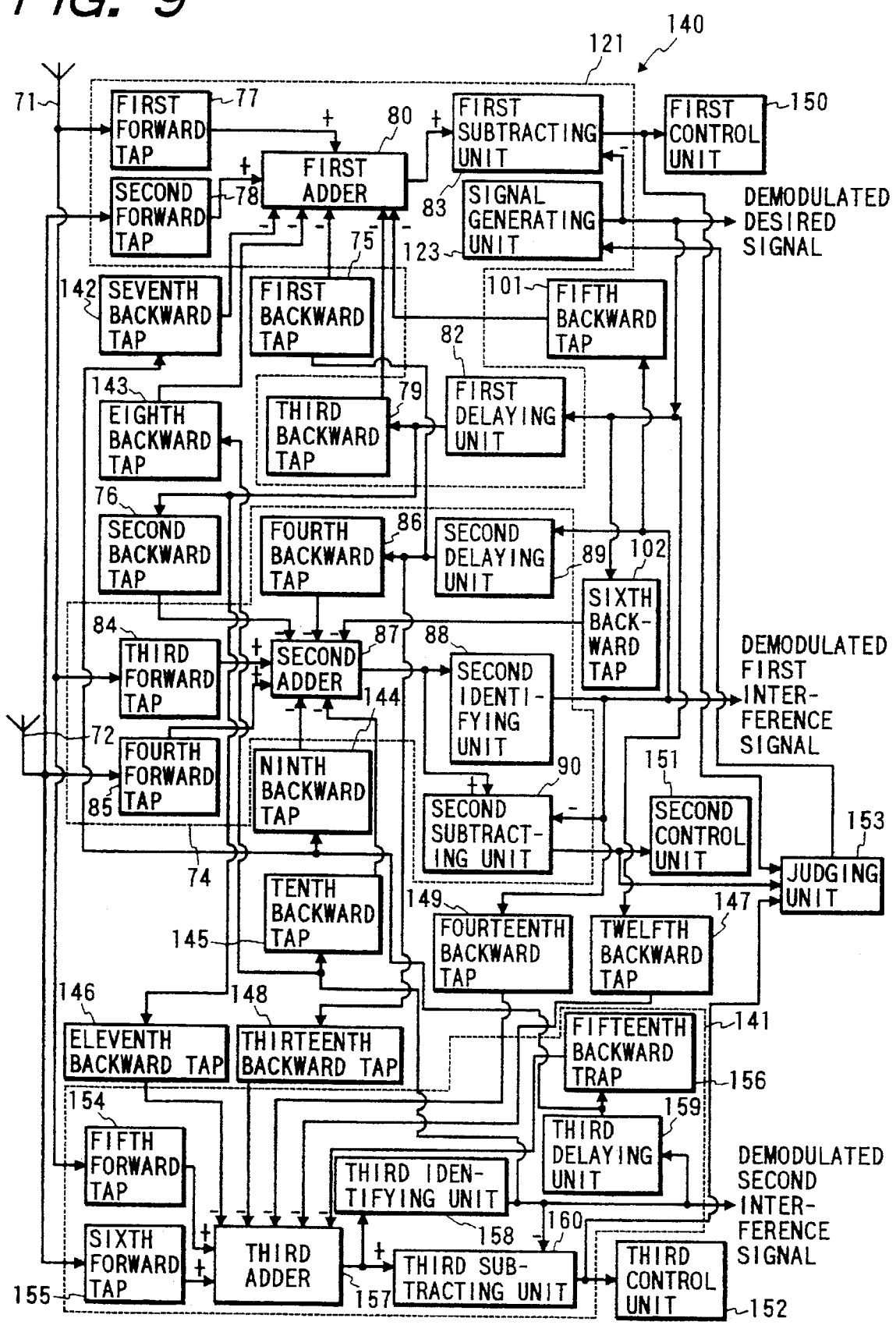
FIG. 9 is a block diagram of a data receiving system for receiving data signals transmitted through a propagation path, according to a sixth embodiment of the present invention.

FIG. 9 is a block diagram of a data receiving system for receiving the data signals R1 and R2 transmitted through a propagation path, according to a sixth embodiment of the present invention.

In the sixth and eighth embodiments, the data signals R1 and R2 received by the antennas 71 and 72 is composed of the desired signal S1, a first interference signal S2 and a second interference signal S3. Therefore, the data signals R1 and R2 are formulated as follows.

$$R1=A*S1+C*S2+P*S3$$

$$R2=B*S1+D*S2+Q*S3$$

$$P=P0+P1*Z^{-1}, Q=Q0+Q1*Z^{-1} \qquad (17)$$

As shown in FIG. 9, a data receiving system 140 comprises the antennas 71 and 72, the desired signal equalizing unit 121, the first backward tap 75, the fifth backward tap 101, the interference signal equalizing unit 74 called a first interference signal equalizing unit hereinafter, the second backward tap 76, the sixth backward tap 102, a second interference signal equalizing unit 141 for producing a second demodulated interference signal and a third error, a seventh backward tap 142 for generating a replica of a delay component of the second interference signal S3 according to a tap coefficient by using the second demodulated interference signal and outputting the replica to the first adder 80 to remove the delay component of the second interference signal S3 from a first output signal X1 output from the first adder 80, an eighth backward tap 143 for generating a replica of a direct component of the second interference signal S3 according to a tap coefficient by using the second demodulated interference signal and outputting the replica to the first adder 80 to remove the direct component of the second interference signal S3 from the first output signal X1, a ninth backward tap 144 for generating a replica of the delay component of the second interference signal S3 according to a tap coefficient by using the second demodulated interference signal and outputting the replica to the second adder 87 to remove the delay component of the second interference signal S3 from a second output signal X2 output from the second adder 87, a tenth backward tap 145 for generating a replica of the direct component of the second interference signal S3 according to a tap coefficient by using the second demodulated interference signal and outputting the replica to the second adder 87 to remove the direct component of the second interference signal S3 from the second output signal X2, an eleventh backward tap 146 for generating a replica of a delay component of the desired signal S1 according to a tap coefficient by using an assumptive desired signal output from the signal generating unit 123 and outputting the replica to the second interference signal equalizing unit 141 to remove the delay component of the desired signal S1 from the second demodulated interference signal, a twelfth backward tap 147 for generating a replica of a direct component of the desired signal S1 according to a tap coefficient by using the assumptive desired signal and outputting the replica to the second interference signal equalizing unit 141 to remove the direct component of the desired signal S1 from the second demodulated interference signal, a thirteenth backward tap 148 for generating a replica of a delay component of the first interference signal S2 according to a tap coefficient by using the first demodulated interference signal and outputting the replica to the second interference signal equalizing unit 141 to remove the delay component of the first interference signal S2 from the second demodulated interference signal, a fourteenth backward tap 149 for generating a replica of a direct component of the first interference signal S2 according to a tap coefficient by using the first demodulated interference signal and outputting the replica to the second interference signal equalizing unit 141 to remove the direct component of the first interference signal S2 from the second demodulated interference signal, a first control unit 150 for controlling the forward and backward taps 75, 77, 78, 79, 101, 142 and 143 to minimize the first error, a second control unit 151 for controlling the forward and backward taps 76, 84, 85, 86, 102, 144 and 145 to minimize the second error, a third control unit 152 for controlling the taps 146 to 149 and the equalizing unit 141, and a judging unit 153 for judging which of the assumptive desired signals agrees with the desired signal S1 according to the first, second and third errors.

Each of the backward taps 142 to 149 is formed of a weighting unit in which an input signal is weighted by a gain determined by a tap coefficient.

The second interference signal equalizing unit 141 classified as a linear equalizing unit comprises a fifth forward tap 154 for filtering the first data signal R1 received by the first antenna 71 according to a tap coefficient controlled by the third control unit 152, a sixth forward tap 155 for filtering the second data signal R2 received by the second antenna 72 according to a tap coefficient controlled by the third control unit 152, a fifteenth backward tap 156 for generating a replica of the delay component of the second interference signal S3 according to the second demodulated interference signal and a tap coefficient controlled by the third control unit 152, a third adder 157 for adding the first and second data signals R1 and R2 filtered in the forward taps 77 and 78 to remove the direct component of the interference signals S1 and S2, subtracting the replicas of the delay components of the desired and first interference signals S1 and S2 generated in the backward taps 146 and 148 and subtracting the replicas of the direct components of the desired and first interference signals S1 and S2 generated in the backward taps 147 and 149 to produce a third output signal X3, a third identifying unit 158 for outputting a third identified signal Y3 as the second demodulated interference signal by quantizing the third output signal X3 to a series of binary values, a third delaying unit 159 for delaying the third identified signal Y3 by one symbol delay time and outputting the signal Y3 as a third delayed signal, and a third subtracting unit 160 for subtracting the third identified signal Y3 from the third output signal X3 to obtain the third error. The forward taps 154 and 155 and the backward taps 156 and 79 are controlled by the third control unit 152 to converge the third error to zero.

In the above configuration, each time an assumptive desired signal is generated in the signal generating unit 123, a first operation in which the desired signal equalizing unit 121, the backward taps 75, 101, 142 and 143 and the first control unit 150 are operated, a second operation in which the first interference signal equalizing unit 74, the backward taps 76, 102, 144 and 145 and the second control unit 151 are operated and a third operation in which the second interference signal equalizing unit 141, the backward taps 146 to 149 and the third control unit 152 are operated are performed in parallel with each other.

In the second operation, the direct components of the desired signal S1 and the second interference signal S3 are removed from the second. output signal X2 by the function of the forward taps 84 and 85 and the backward taps 102 and 145, the delay components of the desired signal S1 and the second interference signal S3 are removed from the second output signal X2 by the function of the backward taps 76 and 144, and the delay component of the first interference signal S2 is removed from the second output signal X2 by the function of the backward tap 86.

In the third operation, the direct components of the desired signal S1 and the first interference signal S2 are removed from a third output signal X3 output from the third adder 157 by the function of the forward taps 154 and 155 and the backward taps 147 and 149, the delay components of the desired signal S1 and the first interference signal S2 are removed from the third output signal X3 by the function of the backward taps 146 and 148, and the delay component of the second interference signal S3 is removed from the third output signal X3 by the function of the backward tap 156. The third output signal X3 output from the third adder 157 is changed to a third identified signal Y3 in the third identifying unit 158. The third identified signal Y3 is output as a demodulated second interference signal. Also, the third identified signal Y3 is stored in the third delaying unit 159. Also, the third identified signal Y3 is subtracted from the third output signal X3 in the third subtracting unit 160 to produce a third error, and the forward taps 154 and 155 and the backward taps 146, 147, 148, 149 and 156 are adjusted by the third control unit 152 to minimize an absolute value of the third error.

In the first operation, the direct components of the first and second interference signals S2 and S3 are removed from the first output signal X1 by the function of the forward taps 77 and 78 and the backward taps 101 and 143, the delay components of the first and second interference signals S2 and S3 are removed from the first output signal X1 by the function of the backward taps 75 and 142, and the delay component of the desired signal S1 is removed from the first output signal X1 by the function of the backward tap 79.

After all assumptive desired signals are output from the signal generating unit 123, a sum of a squared first error, a squared second error and a squared third error is calculated in the judging unit 153 for each of the assumptive desired signals, a particular assumptive desired signal relating to a minimum sum among the sums is selected, and it is judged by the judging unit 153 that the particular assumptive desired signal agrees with the desired signal S1. Thereafter, the particular assumptive desired signal is always output from the signal generating unit 123 as a demodulated desired signal. Because the demodulated desired signal is correctly output from the unit 123, a first demodulated interference signal agreeing with the first interference signal S2 is reliably output from the second identifying unit 88, and a second demodulated interference signal agreeing with the second interference signal S3 is reliably output from the third identifying unit 158 in the same manner as in the fourth embodiment.

Accordingly, even though two types of interference signals exist in each of the data signals S1 and S2, a receiving quality for the desired signal can be improved in the same manner as in the fourth embodiment even though the volume of calculation required for the data receiving system 140 is small, and a frequency utilizing efficiency can be improved.

Also, there is no probability that the desired signal S1 and the interference signals S2 and S3 are not immediately demodulated because the desired signal S1 and the interference signals S2 and S3 are erroneously assumed in an initial operation. Therefore, the desired signal S1 and the interference signals S2 and S3 can be rapidly demodulated or assumed at high probability as compared with that in the second embodiment.

In practical use, because propagation characteristics of the propagation path are unknown, the tap coefficients of the forward and backward taps 77, 78, 84, 85, 79, 75, 76, 86, 101, 102, 142 to 149 and 156 are optimized while gradually minimizing the first, second and third errors.

In the sixth embodiment, two interference signals exist in each of the data signals R1 and R2. However, even though the number of interference signals existing in each of the data signals R1 and R2 is more than two, the adverse influence of the interference signals and the delay component of the desired signal can be perfectly suppressed. That is, in cases where the number of interference signals is N, the number of signal equalizing units is set to N+1. Therefore, an assumptive desired signal agreeing with the desired signal can be determined in one signal equalizing unit, and each of the demodulated interference signals is obtained in one of the N signal equalizing units.

Also, even though a plurality of delay components exists in each of the desired and interference signals, the adverse influence of the interference signals and the delay components of the desired signal can be perfectly suppressed. That is, in cases where the number of delay components in each of the desired and interference signals is M, M sets of delay component circuits which each has one delaying unit and N+1 backward taps are prepared for each of the signal equalizing units.

Also, in cases where a tap distance of the forward taps is set to 1/N0 (N0 is a natural number equal to or higher than 2) of one symbol delay time, a timing difference between the desired and interference signals and a timing difference in synchronization are absorbed. Therefore, the adverse influence of adjacent interference signals can be suppressed.

Also, the diversity reception is performed by using two antennas 71 and 72. However, it is applicable that the number of antennas used for the diversity reception be more than two. In this case, the adverse influence of the fading in the propagation path can be moreover suppressed.

(Seventh Embodiment)

Figure 10:
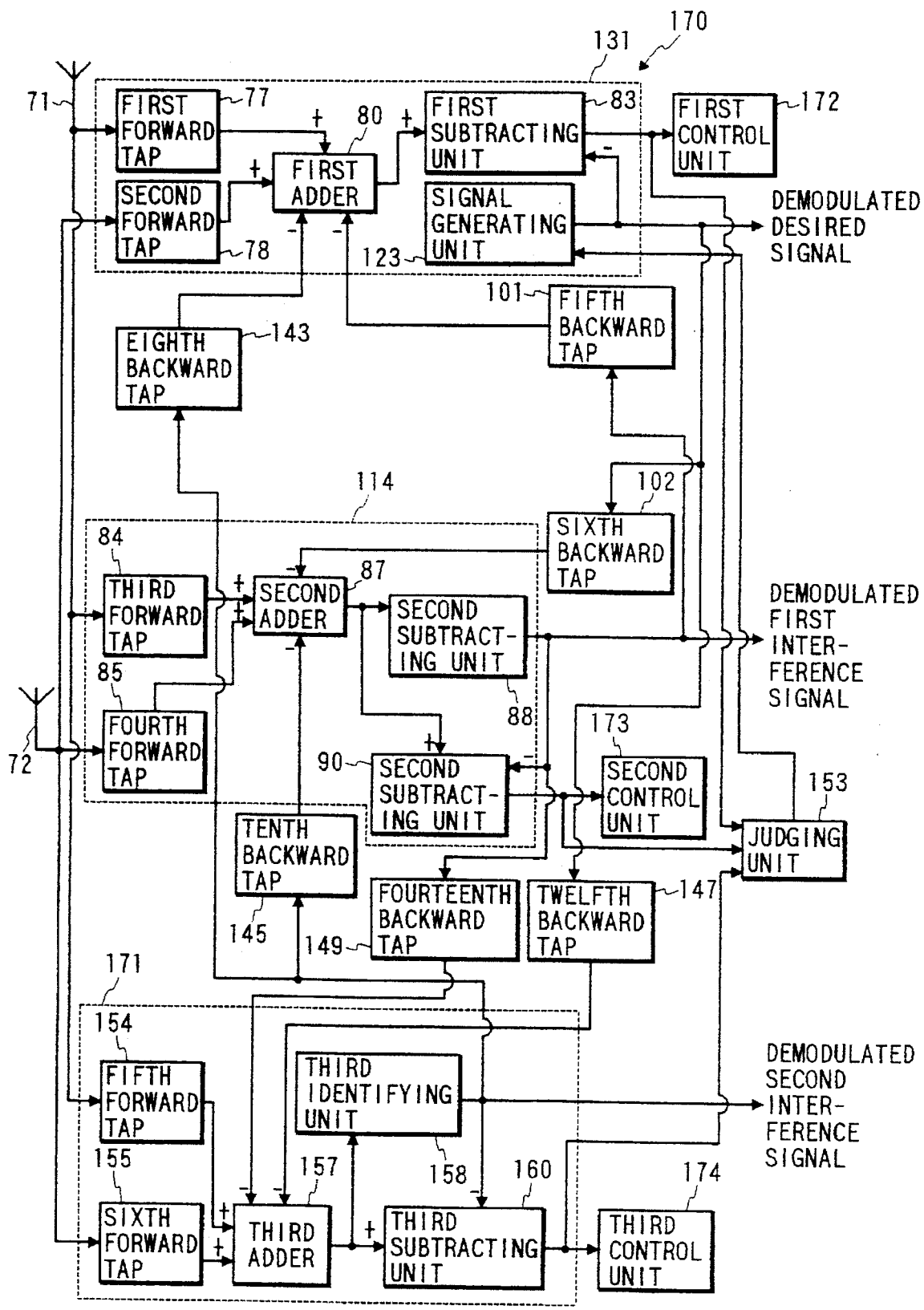
FIG. 10 is a block diagram of a data receiving system for receiving data signals transmitted through a propagation path, according to a seventh embodiment of the present invention.

FIG. 10 is a block diagram of a data receiving system for receiving the data signals R1 and R2 transmitted through a propagation path, according to a seventh embodiment of the present invention.

In the seventh and ninth embodiments, the data signals R1 and R2 received by the antennas 71 and 72 is composed of the desired signal S1 having no delay component, a first interference signal S2 having no delay component and a second interference signal S3 having no delay component. Therefore, the data signals R1 and R2 are formulated as follows.

$$R1=A*S1+C*S2+P*S3$$

$$R2=B*S1+D*S2+Q*S3$$

$$A=A0, B=B0, C=C0, D=D0, P=P0, Q=Q0 \quad (18)$$

As shown in FIG. 10, a data receiving system 170 comprises the antennas 71 and 72, the desired signal equalizing unit 131, the backward taps 101 and 143, the interference signal equalizing unit 114 called a first interference signal equalizing unit, the backward taps 102 and 145, a second interference signal equalizing unit 171 for producing a second demodulated interface signal and a third error, a first control unit 172 for controlling the forward and backward taps 77, 78, 101 and 143, a second control unit 173 for controlling the forward and backward taps 84, 85, 102 and 145, a third control unit 174 for controlling the forward and backward taps 154, 155, 147 and 149 to minimize the third error, and the judging unit 153.

The second interference signal equalizing unit 171 classified as a linear equalizing unit comprises the forward taps 154 and 155, the third adder 157, the third identifying unit 158 and the third subtracting unit 160, the backward taps 147 and 149.

In the above configuration, each time an assumptive desired signal is generated in the signal generating unit 123, a first operation in which the desired signal equalizing unit 131 and the backward taps 101 and 143 are operated, a second operation in which the first interference signal equalizing unit 114 and the backward taps 102 and 145 are operated and a third operation in which the second interference signal equalizing unit 171 and the backward taps 147 and 149 are operated are performed in parallel with each other.

In the second operation, the direct components of the desired signal S1 and the second interference signal S3 are removed from the second output signal X2 by the function of the forward taps 84 and 85 and the backward taps 102 and 145 under control of the second control unit 173.

In the third operation, the direct components of the desired signal S1 and the first interference signal S2 are removed from the third output signal X3 by the function of the forward taps 154 and 155 and the backward taps 147 and 149 under control of the third control unit 174.

In the first operation, the direct components of the first and second interference signals S2 and S3 are removed from the first output signal X1 by the function of the forward taps 77 and 78 and the backward taps 101 and 143 under control of the first control unit 172.

After all assumptive desired signals are output from the signal generating unit 123, a particular assumptive desired signal agreeing with the desired signal S1 is determined by the judging unit 153 in the same manner as in the sixth embodiment, and the particular assumptive desired signal is always output from the signal generating unit 123.

Accordingly, even though two types of interference signals exist in each of the data signals S1 and S2 on condition that no delay components exists in each of the data signals, a receiving quality for the desired signal can be improved in the same manner as in the sixth embodiment on condition that the volume of calculation required for the data receiving system 170 is small, and a frequency utilizing efficiency can be improved.

Also, because the number of taps is reduced as compared with that in the sixth embodiment, the volume of calculation required in the data receiving system 170 can be considerably reduced. Also, even though conditions of the propagation path change, because the number of taps is reduced and the particular assumptive desired signal agreeing with the desired signal S1 is always output from the signal generating unit 123, the first demodulated interference signal agreeing with the first interference signal S2 and the second demodulated interference signal agreeing with the second interference signal S3 can be immediately obtained.

In practical use, because propagation characteristics of the propagation path are unknown, the tap coefficients of the forward and backward taps 77, 78, 84, 85, 101, 102, 143, 145, 147, 149,154 and 155 are optimized while gradually minimizing the first, second and third errors.

In the seventh embodiment, two interference signals exist in each of the data signals R1 and R2. However, even though the number of interference signals existing in each of the data signals R1 and R2 is more than two, the adverse influence of the interference signals can be perfectly suppressed. That is, in cases where the number of interference signals is N, the number of signal equalizing units is set to N+1. Therefore, an assumptive desired signal agreeing with the desired signal can be determined in one signal equalizing unit, and each of the demodulated interference signals is obtained in one of the N signal equalizing units.

Also, in cases where a tap distance of the forward taps is set to 1/N0 (N0 is a natural number equal to or higher than 2) of one symbol delay time, a timing difference between the desired and interference signals and a timing difference in synchronization are absorbed. Therefore, the adverse influence of adjacent interference signals can be suppressed.

Also, the diversity reception is performed by using two antennas 71 and 72. However, it is applicable that the number of antennas used for the diversity reception be more than two. In this case, the adverse influence of the fading in the propagation path can be moreover suppressed.

(Eighth Embodiment)

Figure 11:
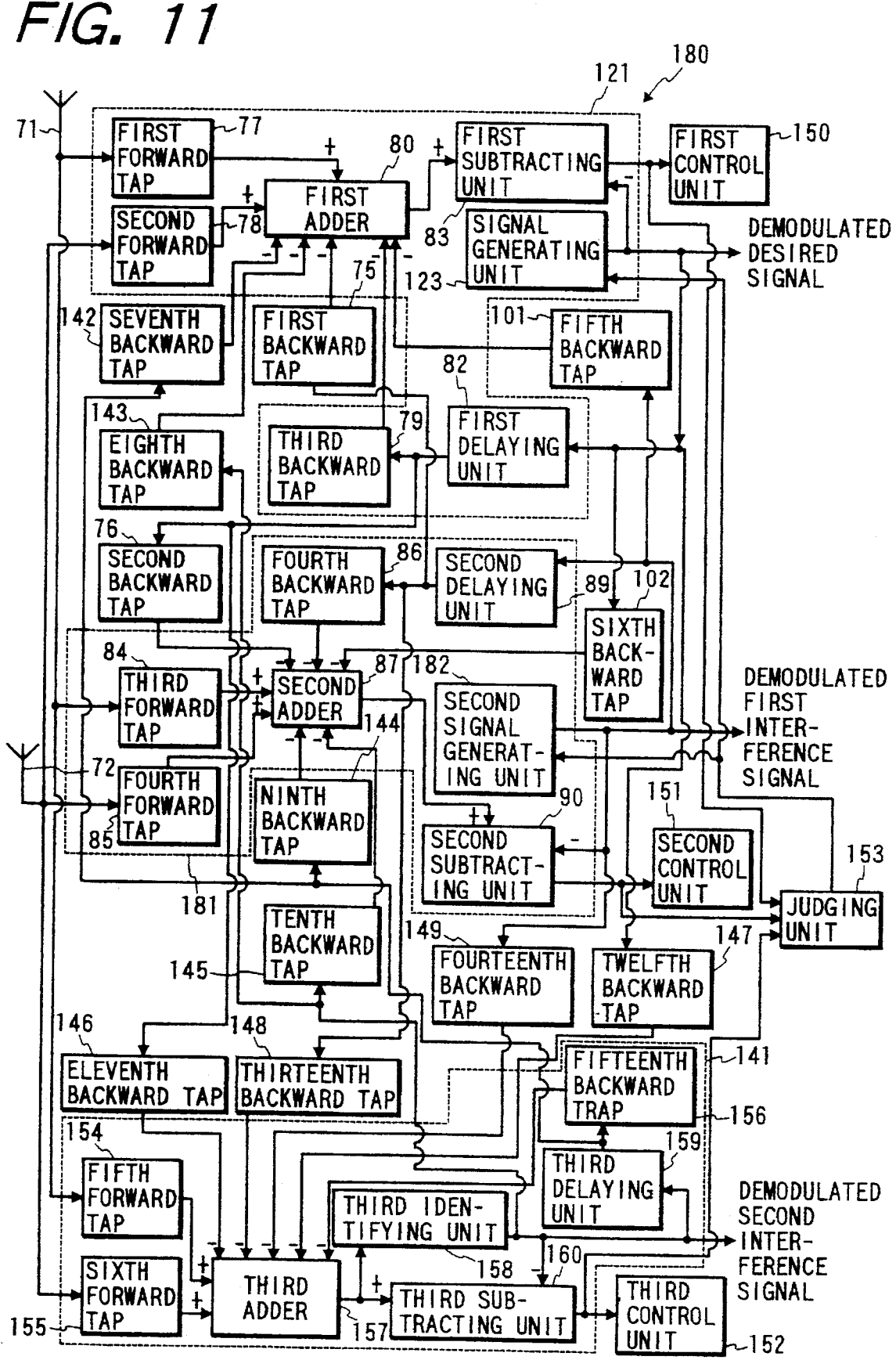
FIG. 11 is a block diagram of a data receiving system for receiving data signals transmitted through a propagation path, according to an eighth embodiment of the present invention.

FIG. 11 is a block diagram of a data receiving system for receiving the data signals R1 and R2 transmitted through a propagation path, according to an eighth embodiment of the present invention.

As shown in FIG. 11, a data receiving system 180 comprises the antennas 71 and 72, the desired signal equalizing unit 121, the backward taps 75, 101, 142 and 143, the first control unit 150, a first interference signal equalizing unit 181 for producing a first modified interference signal and a second error, the backward taps 76, 102, 144 and 145, the second control unit 151, the second interference signal equalizing unit 141, the backward taps 146 to 149, the third control unit 152 and the judging unit 153.

The first interference signal equalizing unit 181 classified as a modified decision-feedback type of equalizer comprises the forward taps 84 and 85, the backward tap 86, the second adder 87, a second signal generating unit 182 for generating a plurality of assumptive interference signals which each agree with the first interference signal S2 received by the antennas 77 and 78 at some likelihood, the second delaying unit 89 for delaying each of the assumptive interference signals by one symbol delaying time and outputting each assumptive interference signal as a second delayed signal, and the second subtracting unit 90 for subtracting each assumptive interference signal from a second output signal X2 output from the second adder 87.

In the above configuration, N1 types of assumptive desired signals respectively agreeing with the desired signal S1 at some likelihood are output from the signal generating unit 123 called a first signal generating unit one after another, and N2 types of assumptive interference signals respectively agreeing with the first interference signal S2 at some likelihood are output from the second signal generating unit 182 one after another in synchronization with the assumptive desired signals. In this case, because there are N1*N2 combinations of the assumptive desired signals and the assumptive interference signals, N1*N2 types of trials are performed one after another to obtain a first error, a second error and a third error for each of the trials.

When a first data signal R1 expressed according to the equation (17) is received by the first antenna 71 and a second data signal R2 expressed according to the equation (17) is received by the second antenna 72, one type of assumptive desired signal is output from the first signal generating unit 123 and one type of assumptive interference signal is output from the second signal generating unit 182. Thereafter, a first operation in which the desired signal equalizing unit 121, the backward taps 75, 101, 142 and 143 and the first control unit 150 are operated, a second operation in which the first interference signal equalizing unit 181, the backward taps 76, 102, 144 and 145 and the second control unit 151 are operated and a third operation in which the second interference signal equalizing unit 141, the backward taps 146 to 149 and the third control unit 152 are operated are performed in one trial in parallel with each other.

In the third operation, a replica of a delay component of the desired signal S1 is produced in the backward tap 146, a replica of a direct component of the desired signal S1 is produced in the backward tap 147, a replica of a delay component of the first interference signal S2 is produced in the backward tap 148, and a replica of a direct component of the first interference signal S2 is produced in the backward tap 149 by weighting an assumptive interference signal Y2 output from the second signal generating unit 182. Thereafter, the replicas are subtracted in the third adder 156 from the sum of the data signals filtered in the forward taps 154 and 155, and a second demodulated interference signal and a third error are produced in the second interference signal equalizing unit 141 in the same manner as in the sixth embodiment.

In the second operation, a second output signal X2 is output from the second adder 87 in the same manner as in the sixth embodiment, the assumptive interference signal Y2 output from the second signal generating unit 182 is delayed by one symbol delay time in the second delaying unit 89 to produce a second delayed signal output to the backward trap 148, the assumptive interference signal Y2 is subtracted from the second output signal X2 in the second subtracting unit 90 to produce a second error.

In the first operation, a replica of a delay component of the second interference signal S3 is produced in the backward tap 142, a replica of a direct component of the second interference signal S3 is produced in the backward tap 143, a replica of a delay component of the first interference signal S2 is produced in the backward tap 75, and a replica of a direct component of the first interference signal S2 is produced in the backward tap 101 by weighting the assumptive interference signal Y2 output from the second signal generating unit 182. Thereafter, a first error is produced in the same manner as in the sixth embodiment.

After all combinations of the assumptive desired signals and the assumptive interference signals are output from the signal generating units 123 and 182, a sum of a squared first error, a squared second error and a squared third error is calculated in the judging unit 153 for each of the combinations of the assumptive desired and interference signals, a combination of a particular assumptive desired signal and a particular assumptive interference signal relating to a minimum sum among the sums is selected, and it is judged by the judging unit 153 that the particular assumptive desired signal agrees with the desired signal S1 and a particular assumptive interference signal agrees with the first interference signal S2. Thereafter, the particular assumptive desired signal is always output from the first signal generating unit 123 as a demodulated desired signal, and the particular assumptive interference signal is always output from the second signal generating unit 182 as a first demodulated interference signal. Because the demodulated desired signal and the first demodulated interference signal are correctly output from the units 123 and 182, a second demodulated interference signal agreeing with the second interference signal S3 is reliably output from the third identifying unit 158 in the same manner as in the fourth embodiment.

Accordingly, because the assumptive desired signals respectively agreeing with the desired signal S1 at some likelihood and the assumptive interference signals respectively agreeing with the first interference signal S2 at some likelihood are output from the signal generating units 123 and 182 to select the combination of the particular assumptive desired signal and the particular assumptive interference signal relating to a minimum sum of the squared errors, there is no probability that the desired signal S1 and the interference signals S2 and S3 are not immediately demodulated because the desired signal S1 and the interference signals S2 and S3 are erroneously assumed in an initial trial. Therefore, the desired signal S1 and the interference signals S2 and S3 can be rapidly demodulated at high probability as compared with that in the sixth embodiment. Also, a receiving quality for the desired signal and a frequency utilizing efficiency can be moreover improved as compared with those in the sixth embodiment.

In practical use, because propagation characteristics of the propagation path are unknown, the tap coefficients of the forward and backward taps 77, 78, 84, 85, 79, 75, 76, 86, 101, 102, 142 to 149 and 156 are optimized while gradually minimizing the first, second and third errors.

In the eighth embodiment, two interference signals exist in each of the data signals R1 and R2. However, even though the number of interference signals existing in each of the data signals R1 and R2 is more than two, the adverse influence of the interference signals and the delay component of the desired signal can be perfectly suppressed. That is, in cases where the number of interference signals is N, the number of signal equalizing units is set to N+1. Therefore, an assumptive desired signal agreeing with the desired signal can be determined in one signal equalizing unit, and each of the demodulated interference signals is obtained in one of the N signal equalizing units.

Also, even though a plurality of delay components exists in each of the desired and interference signals, the adverse influence of the interference signals and the delay components of the desired signal can be perfectly suppressed. That is, in cases where the number of delay components in each of the desired and interference signals is M, M sets of delay component circuits which each has one delaying unit and N+1 backward taps are prepared for each of the signal equalizing units.

Also, in cases where a tap distance of the forward taps is set to 1/N0 (N0 is a natural number equal to or higher than 2) of one symbol delay time, a timing difference between the desired and interference signals and a timing difference in synchronization are absorbed. Therefore, the adverse influence of adjacent interference signals can be suppressed.

Also, the diversity reception is performed by using two antennas 71 and 72. However, it is applicable that the number of antennas used for the diversity reception be more than two. In this case, the adverse influence of the fading in the propagation path can be moreover suppressed.

(Ninth Embodiment)

Figure 12:
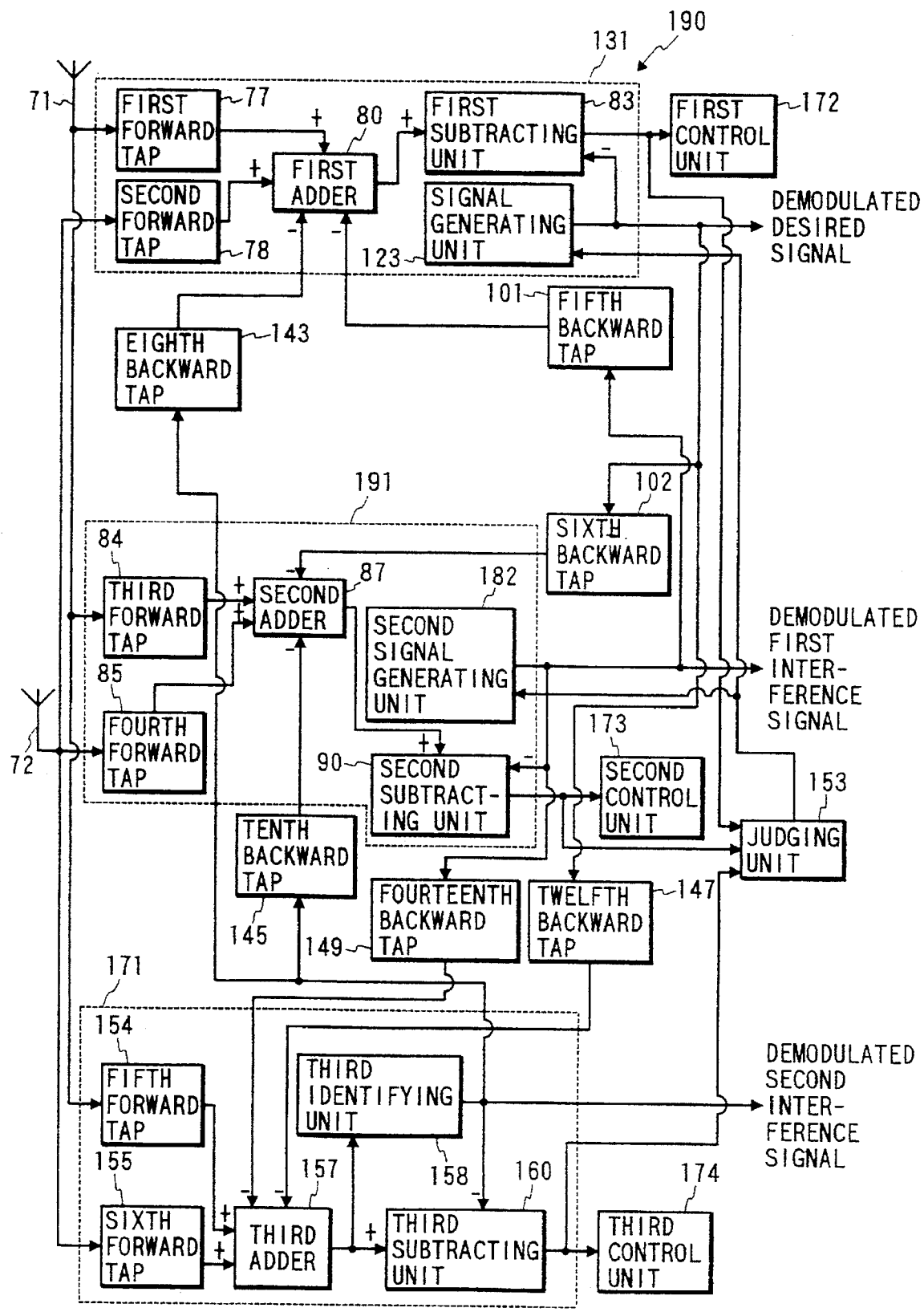
FIG. 12 is a block diagram of a data receiving system for receiving data signals transmitted through a propagation path, according to a ninth embodiment of the present invention.

FIG. 12 is a block diagram of a data receiving system for receiving the data signals R1 and R2 transmitted through a propagation path, according to a ninth embodiment of the present invention.

As shown in FIG. 12, a data receiving system 190 comprises the antennas 71 and 72 for receiving the first and second data signals R1 and R2 expressed according to the equation (18), the desired signal equalizing unit 131, the backward taps 101 and 143, the first control unit 172, a first interference signal equalizing unit 191 for producing a first demodulated interference signal and a second error, the backward taps 102 and 145, the second control unit 173, the second interference signal equalizing unit 171, the backward taps 147 and 149, the third control unit 174, and the judging unit 153.

The second interference signal equalizing unit 191 classified as a modified linear equalizing unit comprises the forward taps 84 and 85, the second adder 87, the second signal generating unit 182 and the second subtracting unit 90.

In the above configuration, each time a combination of assumptive desired and interference signals is output from the signal generating units 123 and 182 in the same manner as in the eighth embodiment, a first operation in which the desired signal equalizing unit 131 and the backward taps 101 and 143 are operated, a second operation in which the first interference signal equalizing unit 191 and the backward taps 102 and 145 are operated and a third operation in which the second interference signal equalizing unit 171 and the backward taps 147 and 149 are operated are performed in parallel with each other.

In the third operation, a replica of a direct component of the desired signal S1 is produced in the backward tap 147, a replica of a direct component of the first interference signal S2 is produced in the backward tap 149 by weighting an assumptive interference signal Y2 output from the second signal generating unit 182, the direct components of the desired signal S1 and the first interference signal S2 are removed from a third output signal X3 by subtracting the replicas in the third adder 156 from the sum of the data signals R1 and R2 filtered in the forward taps 154 and 155, and a third identified signal Y3 is subtracted from the third output signal X3 in the third subtracting unit 160 to produce a third error.

In the second operation, a replica of a direct component of the desired signal S1 is produced in the backward tap 102, a replica of a direct component of the second interference signal S3 is produced in the backward tap 145, the direct components of the desired signal S1 and the second interference signal S3 are removed from a second output signal X2 by subtracting the replicas in the second adder 87 from the sum of the data signals R1 and R2 filtered in the forward taps 84 and 85, and a second identified signal Y2 is subtracted from the second output signal X2 in the second subtracting unit 90 to produce a second error.

In the first operation, a replica of a direct component of the first interference signal S2 is produced in the backward tap 102 by weighting the aSsumptive interference signal Y2 output from the second signal generating unit 182, a replica of a direct component of the second interference signal S3 is produced in the backward tap 143, the direct components of the first and second interference signals S2 and S3 are removed from a first output signal X1 by subtracting the replicas in the first adder 80 from the sum of the data signals R1 and R2 filtered in the forward taps 77 and 78, and a first identified signal Y1 is subtracted from the first output signal X1 in the first subtracting unit 83 to produce a first error.

After all combinations of the assumptive desired and interference signals are output from the signal generating units 123 and 182, a combination of a particular assumptive desired signal and a particular assumptive interference signal relating to a minimum sum among the sums is selected by the judging unit 153, the particular assumptive desired signal is always output from the first signal generating unit 123 as a demodulated desired signal, and the particular assumptive interference signal is always output from the second signal generating unit 182 as a first demodulated interference signal in the same manner as in the eighth embodiment. Because the demodulated desired signal and the first demodulated interference signal are correctly output from the units 123 and 182, a second demodulated interference signal agreeing with the second interference signal S3 is reliably output from the third identifying unit 158 in the same manner as in the eighth embodiment.

Accordingly, because the number of taps is reduced as compared with that in the eighth embodiment, the volume of calculation required in the data receiving system 190 can be considerably reduced. Also, even though conditions of the propagation path change, because the number of taps is reduced and the particular assumptive desired and interference signals agreeing with the desired signal S1 are always output, the second demodulated interference signal agreeing with the second interference signal S3 can be immediately obtained.

Also, because the assumptive desired signals respectively agreeing with the desired signal S1 at some likelihood and the assumptive interference signals respectively agreeing with the first interference signal S2 at some likelihood are output from the signal generating units 123 and 182 to select the combination of the particular assumptive desired and interference signals relating to a minimum sum of the squared errors, there is no probability that the desired signal S1 and the interference signals S2 and S3 are not immediately demodulated because the desired signal S1 and the interference signals S2 and S3 are erroneously assumed in an initial trial. Therefore, the desired signal S1 and the interference signals S2 and S3 can be rapidly demodulated at high probability as compared with that in the seventh embodiment. Also, a receiving quality for the desired signal and a frequency utilizing efficiency can be moreover improved as compared with those in the seventh embodiment.

In practical use, because propagation characteristics of the propagation path are unknown, the tap coefficients of the forward and backward taps 77, 78, 84, 85, 101, 102, 143, 145, 147, 149, 154 and 155 are optimized while gradually minimizing the first, second and third errors.

In the ninth embodiment, two interference signals exist in each of the data signals R1 and R2. However, even though the number of interference signals existing in each of the data signals R1 and R2 is more than two, the adverse influence of the interference signals can be perfectly suppressed. That is, in cases where the number of interference signals is N, the number of signal equalizing units is set to N+1. Therefore, a assumptive desired signal agreeing with the desired signal can be determined in one signal equalizing unit, and each of the demodulated interference signals is obtained in one of the N signal equalizing units.

Also, in cases where a tap distance of the forward taps is set to 1/N0 (N0 is a natural number equal to or higher than 2) of one symbol delay time, a timing difference between the desired and interference signals and a timing difference in synchronization are absorbed. Therefore, the adverse influence of adjacent interference signals can be suppressed.

Also, the diversity reception is performed by using two antennas 71 and 72. However, it is applicable that the number of antennas used for the diversity reception be more than two. In this case, the adverse influence of the fading in the propagation path can be moreover suppressed.

Also, because there are two types of interference signals S2 and S3 in the sixth to ninth embodiments, it is preferred that three antennas be provided for each of the data receiving systems 140, 170, 180 and 190. That is, a forward tap for filtering the data signals R1 and R2 received in a third antenna is additionally provided for each of the desired and interference signal equalizing units 121, 131, 74, 141, 114, 171, 181 and 191.

Having illustrated and described the principles of the present invention in a preferred embodiment thereof, it should be readily apparent to those skilled in the art that the invention can be modified in arrangement and detail without departing from such principles. We claim all modifications coming within the spirit and scope of the accompanying claims.

What is claimed is:

1. A data receiving system, comprising:

a plurality of antennas for respectively receiving a data signal having a desired signal and one or a plurality of interference signals, the number of interference signals being N (N is a natural number), the number of antennas being N+M (M is a natural number, or M is equal to zero in case of N=2), the desired signal being composed of a direct component not delayed in a propagation path for the desired signal and a delay component, and each of the interference signals being composed of a direct component not delayed in another propagation path and a delay component;

a desired signal equalizing unit for removing the direct components of all interference signals and the delay component of the desired signal from the data signals received by all antennas and producing a desired intermediate signal including the delay components of all interference signals;

one or a plurality of interference signal equalizing units, which each correspond to one particular interference signal selected from among all interference signals, for respectively removing the delay component of the particular interference signal, the direct components of (N−1) other interference signals other than the particular interference signal and the direct component of the desired signal from the data signals received by all antennas and producing an interference intermediate signal including the delay components of the (N−1) other interference signals and the delay component of the desired signal, the number of interference signal equalizing units being N;

one or a plurality of desired signal backward taps for removing the delay components of all interference signals from the desired intermediate signal produced by the desired signal equalizing unit to make the desired signal equalizing unit output a demodulated desired signal agreeing with the desired signal, the number of desired signal backward taps being N, and each of the desired signal backward taps corresponding to one interference signal; and one or a plurality of interference signal backward taps, corresponding to each of the interference signal equalizing units, for removing the delay components of the (N−1) other interference signals and the delay component of the desired signal from the interference intermediate signal produced by each of the interference signal equalizing units to make each of the interference signal equalizing units output a demodulated interference signal agreeing with the particular interference signal, the number of interference signal backward taps corresponding to one interference signal equalizing unit being N, and each of the interference signal backward taps corresponding to one of the (N−1) other interference signals or the desired signal.

2. A data receiving system according to claim 1 in which the desired signal equalizing unit comprises:

a plurality of desired signal forward taps for filtering the data signals received by all antennas in one-to-one correspondence to remove the direct components of all interference signals from the data signals;

a desired signal delaying unit for delaying a previous demodulated desired signal obtained in a previous operation preceding to a current operation by one symbol delay time to produce a delayed desired signal in the current operation;

a delayed desired signal backward tap for weighting the delayed desired signal produced by the desired signal delaying unit to produce a replica of the delay component of the desired signal; and a desired signal adder for adding the data signals filtered by the desired signal forward taps, subtracting the replica of the delay component of the desired signal produced by the delayed desired signal backward tap from the data signals, subtracting a plurality of replicas of the delay components of the interference signals produced by the desired signal backward taps and producing the demodulated desired signal in the current operation, the demodulated desired signal in the current operation being delayed by the desired signal delaying unit to produce another delayed desired signal in a succeeding operation following the current operation, and each of the interference signal equalizing units comprises:

a plurality of interference signal forward taps for filtering the data signals received by all antennas in one-to-one correspondence to remove the direct components of the (N−1) other interference signals and the direct component of the desired signal from the data signals;

an interference signal delaying unit for delaying a previous demodulated interference signal obtained in the previous operation by one symbol delay time to produce a delayed interference signal in the current operation;

a delayed interference signal backward tap for weighting the delayed interference signal produced by the interference signal delaying unit to produce a replica of the delay component of the particular interference signal; and an interference signal adder for adding the data signals filtered by the interference signal forward taps, subtracting the replica of the delay component of the particular interference signal produced by the delayed interference signal backward tap from the data signals, subtracting a plurality of replicas of the delay components of the (N−1) other interference signals and the desired signal produced by the interference signal backward taps, and producing the demodulated interference signal in the current operation, the demodulated interference signal in the current operation being delayed by the interference signal delaying unit to produce another delayed interference signal in the succeeding operation.

3. A data receiving system according to claim 2 in which each of the desired signal backward taps is formed of a weighting unit for weighting one delayed interference signal produced by one interference signal delaying unit to produce one replica of one delay component of one particular interference signal, and each of the interference signal backward taps is formed of a weighting unit for weighting one delayed interference signal produced by one interference signal delaying unit or the delayed desired signal produced by the desired signal delaying unit to produce one replica of one delay component of one particular interference signal or the replica of the delay component of the desired signal.

4. A data receiving system according to claim 2 in which a tap distance in each of the desired and interference signal forward taps is set to 1/M (M is a natural number equal to or higher than 2) of one symbol delay time.

5. A data receiving system according to claim 1 in which the desired signal equalizing unit comprises:

a plurality of desired signal forward taps for filtering the data signals received by all antennas in one-to-one correspondence to remove the direct components of all interference signals from the data signals;

a desired signal delaying unit for delaying a desired identified signal obtained in a previous operation preceding to a current operation by one symbol delay time to produce a delayed desired signal in the current operation;

a delayed desired signal backward tap for weighting the delayed desired signal produced by the desired signal delaying unit to produce a replica of the delay component of the desired signal;

a desired signal adder for adding the data signals filtered by the desired signal forward taps, subtracting the replica of the delay component of the desired signal produced by the delayed desired signal backward tap from the data signals, subtracting a plurality of replicas of the delay components of the interference signals produced by the desired signal backward taps, and producing a desired output signal;

a desired signal identifying unit for quantizing the desired output signal produced by the desired signal adder to produce a desired identified signal in the current operation, the desired identified signal being delayed by the desired signal delaying unit to produce a delayed desired signal in a succeeding operation following the current operation;

a desired signal subtracting unit for subtracting the desired identified signal produced by the desired signal identifying unit from the desired output signal produced by the desired signal adder to obtain a desired signal error; and a desired signal control unit for repeatedly operating the desired signal equalizing unit to minimize the desired signal error obtained by the desired signal subtracting unit and to output a desired identified signal relating to the minimized desired signal error from the desired signal identifying unit as the demodulated desired signal agreeing with the desired signal, and each of the interference signal equalizing units comprises:

a plurality of interference signal forward taps for filtering the data signals received by all antennas in one-to-one correspondence to remove the direct components of the (N−1) other interference signals and the direct component of the desired signal from the data signals;

an interference signal delaying unit for delaying an interference identified signal obtained in the previous operation by one symbol delay time to produce a delayed interference signal in the current operation;

a delayed interference signal backward tap for weighting the delayed interference signal produced by the interference signal delaying unit to produce a replica of the delay component of the particular interference signal;

an interference signal adder for adding the data signals filtered by the interference signal forward taps, subtracting the replica of the delay component of the particular interference signal produced by the delayed interference signal backward tap from the data signals, subtracting a plurality of replicas of the delay components of the (N−1) other interference signals and the desired signal produced by the interference signal backward taps, and producing an interference output signal in the current operation;

an interference signal identifying unit for quantizing the interference output signal produced by the interference signal adder to produce an interference identified signal in the current operation, the interference identified signal being delayed by the interference signal delaying unit to produce a delayed interference signal in the succeeding operation;

an interference signal subtracting unit for subtracting the interference identified signal produced by the interference signal identifying unit from the interference output signal produced by the interference signal adder to obtain an interference signal error; and an interference signal control unit for repeatedly operating the interference signal equalizing unit to minimize the interference signal error obtained by the interference signal subtracting unit and to output an interference identified signal relating to the minimized interference signal error from the interference signal identifying unit as the demodulated interference signal agreeing with the interference signal.

6. A data receiving system according to claim 5 in which a tap distance in each of the desired and interference signal forward taps is set to 1/M (M is a natural number equal to or higher than 2) of one symbol delay time.

7. A data receiving system according to claim 1 in which the number N of the interference signals is one and the number N+M of the antennas is two.

8. A data receiving system according to claim 1, further comprising:

one or a plurality of second desired backward taps for producing one or a plurality of replicas of the direct components of all interference signals according to the demodulated interference signals output from the interference signal equalizing units and removing the direct components of all interference signals from the desired intermediate signal produced by the desired signal equalizing unit to make the desired signal equalizing unit output the demodulated desired signal agreeing with the desired signal in cooperation with the desired backward taps, the number of second desired signal backward taps being N, and each of the second desired signal backward taps corresponding to one interference signal; and one or a plurality of second interference backward taps, corresponding to each of the interference signal equalizing units, for producing one or a plurality of replicas of the direct components of the (N−1) other interference signals and the desired signal according to (N−1) demodulated interference signals output from (N−1) interference signal equalizing units other than a corresponding interference signal equalizing unit and removing the direct components of the (N−1) other interference signals and the desired signal from the interference intermediate signal produced by the corresponding interference signal equalizing unit to make each of the corresponding interference signal equalizing units output the demodulated interference signal agreeing with the particular interference signal in cooperation with the interference backward taps, the number of second interference signal backward taps corresponding to one interference signal equalizing unit being N, and each of the second interference signal backward taps corresponding to one interference signal or desired signal differing from the particular interference signal.

9. A data receiving system according to claim 8 in which the number N of the interference signals is two and the number N+M of the antennas is two.

10. A data receiving system according to claim 1 in which the desired signal equalizing unit comprises:

a plurality of desired signal forward taps for filtering the data signals received by all antennas in one-to-one correspondence to remove the direct components of all interference signals from the data signals;

a desired signal generating unit for generating a plurality of assumptive desired signals respectively agreeing with the desired signal received by the antennas at some likelihood one after another;

a desired signal delaying unit for delaying the assumptive desired signals generated by the desired signal generating unit one after another to produce a plurality of delayed desired signals one after another;

a delayed desired signal backward tap for weighting each of the delayed desired signals produced by the desired signal delaying unit to produce a replica of the delay component of the desired signal;

a desired signal adder for adding the data signals filtered by the desired signal forward taps, subtracting the replica of the delay component of the desired signal produced by the delayed desired signal backward tap from the data signals, subtracting a plurality of replicas of the delay components of the interference signals produced by the desired signal backward taps, and producing a desired output signal each time one assumptive desired signal is output from the desired signal generating unit; and a desired signal subtracting unit for subtracting each of the assumptive desired signals output from the desired signal generating unit from the desired output signal produced by the desired signal adder to obtain a difference as a desired signal error, each of the interference signal equalizing units comprises:

a plurality of interference signal forward taps for filtering the data signals received by all antennas in one-to-one correspondence to remove the direct components of the (N−1) other interference signals and the direct component of the desired signal from the data signals;

an interference signal delaying unit for delaying an interference identified signal in a previous operation preceding to a current operation by one symbol delay time to produce a delayed interference signal in the current operation;

a delayed interference signal backward tap for weighting the delayed interference signal produced by the interference signal delaying unit to produce a replica of the delay component of the particular interference signal;

an interference signal adder for adding the data signals filtered by the interference signal forward taps, subtracting the replica of the delay component of the particular interference signal produced by the delayed interference signal backward tap from the data signals, subtracting a plurality of replicas of the delay components of the (N−1) other interference signals and the desired signal produced by the interference signal backward taps, and producing an interference output signal in the current operation;

an interference signal identifying unit for quantizing the interference output signal produced by the interference signal adder to produce an interference identified signal in the current operation, the interference identified signal being delayed by the interference signal delaying unit to produce a delayed interference signal in a succeeding operation following the current operation;

an interference signal subtracting unit for subtracting the interference identified signal produced by the interference signal identifying unit from the interference output signal produced by the interference signal adder to obtain a difference as an interference signal error; and an interference signal control unit for repeatedly operating the interference signal equalizing unit to obtain a minimized interference signal error each time one assumptive desired signal is output from the desired signal generating unit, and the data receiving system further comprising:

a judging unit for selecting a particular assumptive desired signal agreeing with the desired signal from among the assumptive desired signals output from the desired signal generating unit according to the desired signal error obtained by the desired signal subtracting unit and the minimized interference signal errors obtained by the interference signal control units and instructing the desired signal generating unit to make the desired signal generating unit output the particular assumptive desired signal, the particular assumptive desired signal being output as the demodulated desired signal, and a particular interference identified signal relating to the particular assumptive desired signal being output from each of the interference signal identifying units of the interference signal equalizing units as the demodulated interference signal.

11. A data receiving system according to claim 10 in which each of the desired signal backward taps is formed of a weighting unit for weighting one delayed interference signal produced by one interference signal delaying unit to produce one replica of one delay component of one particular interference signal, and each of the interference signal backward taps is formed of a weighting unit for weighting one delayed interference signal produced by one interference signal delaying unit or the delayed desired signal produced by the desired signal delaying unit to produce one replica of one delay component of one particular interference signal or the replica of the delay component of the desired signal.

12. A data receiving system according to claim 10 in which a tap distance in each of the desired and interference signal forward taps is set to 1/M (M is a natural number equal to or higher than 2) of one symbol delay time.

13. A data receiving system according to claim 1 in which the desired signal equalizing unit comprises:

a plurality of desired signal forward taps for filtering the data signals received by all antennas in one-to-one correspondence to remove the direct components of all interference signals from the data signals;

a desired signal generating unit for generating a plurality of assumptive desired signals respectively agreeing with the desired signal received by the antennas at some likelihood one after another;

a desired signal delaying unit for delaying the assumptive desired signals generated by the desired signal generating unit one after another to produce a plurality of delayed desired signals one after another;

a delayed desired signal backward tap for weighting each of the delayed desired signals produced by the desired signal delaying unit to produce a replica of the delay component of the desired signal;

a desired signal adder for adding the data signals filtered by the desired signal forward taps, subtracting the replica of the delay component of the desired signal produced by the delayed desired signal backward tap from the data signals, subtracting a plurality of replicas of the delay components of the interference signals produced by the desired signal backward taps, and producing a desired output signal each time one assumptive desired signal is output from the desired signal generating unit; and a desired signal subtracting unit for subtracting each of the assumptive desired signals output from the desired signal generating unit from the desired output signal produced by the desired signal adder to obtain a difference as a desired signal error, a first interference signal equalizing unit, which is defined by classifying the interference signal equalizing units into the first interference signal equalizing unit corresponding to a first interference signal and (N−1) second interference signal equalizing units corresponding to (N−1) second interference signals, comprises:

a plurality of first interference signal forward taps for filtering the data signals received by all antennas in one-to-one correspondence to remove (N−1) direct components of the second interference signals and the direct component of the desired signal from the data signals;

an interference signal generating unit for generating a plurality of assumptive interference signals respectively agreeing with the first interference signal received by the antennas at some likelihood one after another;

a first interference signal delaying unit for delaying the assumptive interference signals generated by the interference signal generating unit one after another to produce a plurality of first delayed interference signals one after another;

a first delayed interference signal backward tap for weighting each of the first delayed interference signals produced by the first interference signal delaying unit to produce a replica of the delay component of the first interference signal;

a first interference signal adder for adding the data signals filtered by the first interference signal forward taps, subtracting the replica of the delay component of the first particular interference signal produced by the first delayed interference signal backward tap from the data signals, subtracting a plurality of replicas of the delay components of the second interference signals and the desired signal produced by the interference signal backward taps corresponding to the first interference signal equalizing unit and producing a first interference output signal in the current operation each time one assumptive interference signal is output from the interference signal generating unit; and a first interference signal subtracting unit for subtracting each of the assumptive interference signals output from the interference signal generating unit from the first interference output signal produced by the first interference signal adder to obtain a difference as a first interference signal error, each of the second interference signal equalizing units comprises:

a plurality of second interference signal forward taps for filtering the data signals received by all antennas in one-to-one correspondence to remove (N−2) direct components of (N−2) other second interference signals other than the particular interference signal, the direct component of the first interference signal and the direct component of the desired signal from the data signals;

a second interference signal delaying unit for delaying an interference identified signal in a previous operation preceding to a current operation by one symbol delay time to produce a second delayed interference signal in the current operation;

a second delayed interference signal backward tap for weighting the second delayed interference signal produced by the second interference signal delaying unit to produce a replica of the delay component of the particular interference signal;

a second interference signal adder for adding the data signals filtered by the second interference signal forward taps, subtracting the replica of the delay component of the particular interference signal produced by the second delayed interference signal backward tap from the data signals and subtracting a plurality of replicas of the delay components of the other second interference signals, the first interference signal and the desired signal produced by the second interference signal backward taps to produce a second interference output signal in the current operation;

an interference signal identifying unit for quantizing the second interference output signal produced by the second interference signal adder to produce an interference identified signal in the current operation, the interference identified signal being delayed by the second interference signal delaying unit to produce a second delayed interference signal in a succeeding operation following the current operation;

a second interference signal subtracting unit for subtracting the interference identified signal produced by the interference signal identifying unit from the second interference output signal produced by the second interference signal adder to obtain a difference as a second interference signal error; and an interference signal control unit for repeatedly operating the interference signal equalizing unit to obtain a minimized interference signal error each time one assumptive desired signal is output from the desired signal generating unit, and the data receiving system further comprising:

a judging unit for selecting a particular assumptive desired signal agreeing with the desired signal from among the assumptive desired signals output from the desired signal generating unit and a particular assumptive interference signal agreeing with the first interference signal from among the assumptive interference signals output from the interference signal generating unit according to the desired signal error obtained by the desired signal subtracting unit, the first interference signal error obtained by the first interference signal subtracting unit and the minimized interference signal errors obtained by the interference signal control units, instructing the desired signal generating unit to make the desired signal generating unit output the particular assumptive desired signal and instructing the interference signal generating unit to make the interference signal generating unit output the particular assumptive interference signal, the particular assumptive desired signal being output as the demodulated desired signal, the particular assumptive interference signal being output as the demodulated first interference signal, and a particular interference identified signal relating to the particular assumptive desired signal and the particular assumptive interference signal being output from each of the interference signal identifying units of the second interference signal equalizing units as the demodulated interference signal.

14. A data receiving system according to claim 13 in which each of the desired signal backward taps is formed of a weighting unit for weighting one delayed interference signal produced by one interference signal delaying unit to produce one replica of one delay component of one particular interference signal, and each of the interference signal backward taps is formed of a weighting unit for weighting one first or second delayed interference signal produced by one first or second interference signal delaying unit or the delayed desired signal produced by the desired signal delaying unit to produce one replica of one delay component of one particular interference signal or the replica of the delay component of the desired signal.

15. A data receiving system according to claim 13 in which a tap distance in each of the desired signal forward taps and the first and second interference signal forward taps is set to 1/M (M is a natural number equal to or higher than 2) of one symbol delay time.

16. A data receiving system, comprising:

a plurality of antennas for respectively receiving a data signal having a desired signal and one or a plurality of interference signals, the number of interference signals being N (N is a natural number), and the number of antennas being N+M (M is a natural number, or M is equal to zero in case of N=2);

a desired signal equalizing unit for imperfectly removing all interference signals from the data signals received by all antennas and producing a desired intermediate signal including all interference signals in some degree;

one or a plurality of interference signal equalizing units, which each correspond to one particular interference signal selected from among all interference signals, for respectively and imperfectly removing (N−1) other interference signals other than the particular interference signal and the desired signal from the data signals received by all antennas and producing an interference intermediate signal including the (N−1) other interference signals and the desired signal in some degree, the number of interference signal equalizing units being N;

one or a plurality of desired signal backward taps for producing one or a plurality of replicas of the interference signals in one-to-one correspondence according to one or a plurality of demodulated interference signals output from the interference signal equalizing units and perfectly removing all interference signals from the desired intermediate signal produced by the desired signal equalizing unit to make the desired signal equalizing unit output a demodulated desired signal agreeing with the desired signal, the number of desired signal backward taps being N, and each of the desired signal backward taps corresponding to one interference signal; and one or a plurality of interference signal backward taps, corresponding to each of the interference signal equalizing units, for producing one or a plurality of replicas of the (N−1) other interference signals and the desired signal in one-to-one correspondence according to (N−1) demodulated interference signals output from (N−1) other interference signal equalizing units other than a corresponding interference signal equalizing unit and the demodulated desired signal output from the desired signal equalizing unit and removing the (N−1) other interference signals and the desired signal from the interference intermediate signal produced by each of the interference signal equalizing units to make each of the interference signal equalizing units output one demodulated interference signal agreeing with the particular interference signal, the number of interference signal backward taps corresponding to one interference signal equalizing unit being N, and each of the interference signal backward taps corresponding to one of the (N−1) other interference signals or desired signal.

17. A data receiving system according to claim 16 in which the desired signal equalizing unit comprises:

a plurality of desired signal forward taps for filtering the data signals received by all antennas in one-to-one correspondence to remove all interference signals from the data signals; and a desired signal adder for adding the data signals filtered by the desired signal forward taps, subtracting the replicas of the interference signals produced by the desired signal backward taps, and outputting the demodulated desired signal, and each of the interference signal equalizing units comprises:

a plurality of interference signal forward taps for filtering the data signals received by all antennas in one-to-one correspondence to remove the (N−1) other interference signals and the desired signal from the data signals; and an interference signal adder for adding the data signals filtered by the interference signal forward taps, subtracting the replicas of the (N−1) other interference signals and the desired signal produced by the interference signal backward taps and producing the demodulated interference signal.

18. A data receiving system according to claim 16 in which each of the desired signal backward taps is formed of a weighting unit for weighting one demodulated interference signal output from one interference signal equalizing unit to produce one replica of one interference signal, and each of the interference signal backward taps is formed of a weighting unit for weighting one demodulated interference signal output from one interference signal equalizing unit or the demodulated desired signal output from the desired signal equalizing unit to produce one replica of one of the (N−1) other interference signals or the replica of the desired signal.

19. A data receiving system according to claim 17 in which a tap distance in each of the desired and interference signal forward taps is set to 1/M (M is a natural number equal to or higher than 2) of one symbol delay time.

20. A data receiving system according to claim 16 in which the desired signal equalizing unit comprises:

a plurality of desired signal forward taps for filtering the data signals received by all antennas in one-to-one correspondence to remove all interference signals from the data signals; and a desired signal adder for adding the data signals filtered by the desired signal forward taps, subtracting the replicas of the interference signals produced by the desired signal backward taps, and outputting a desired output signal;

a desired signal identifying unit for quantizing the desired output signal produced by the desired signal adder to produce a desired identified signal;

a desired signal subtracting unit for subtracting the desired identified signal produced by the desired signal identifying unit from the desired output signal produced by the desired signal adder to obtain a desired signal error; and a desired signal control unit for repeatedly operating the desired signal equalizing unit to minimize the desired signal error obtained by the desired signal subtracting unit and to output a desired identified signal relating to the minimized desired signal error from the desired signal identifying unit as the demodulated desired signal agreeing with the desired signal, and each of the interference signal equalizing units comprises:

a plurality of interference signal forward taps for filtering the data signals received by all antennas in one-to-one correspondence to remove the (N−1) other interference signals and the desired signal from the data signals; and an interference signal adder for adding the data signals filtered by the interference signal forward taps, subtracting the replicas of the (N−1) other interference signals and the desired signal produced by the interference signal backward taps and producing an interference output signal;

an interference signal identifying unit for quantizing the interference output signal produced by the interference signal adder to produce an interference identified signal;

an interference signal subtracting unit for subtracting the interference identified signal produced by the interference signal identifying unit from the interference output signal produced by the interference signal adder to obtain an interference signal error; and an interference signal control unit for repeatedly operating the interference signal equalizing unit to minimize the interference signal error obtained by the interference signal subtracting unit and to output an interference identified signal relating to the minimized interference signal error from the interference signal identifying unit as the demodulated interference signal agreeing with the interference signal.

21. A data receiving system according to claim 20 in which a tap distance in each of the desired and interference signal forward taps is set to 1/M (M is a natural number equal to or higher than 2) of one symbol delay time.

22. A data receiving system according to claim 16 in which the number N of the interference signals is one and the number N+M of the antennas is two.

23. A data receiving system according to claim 16 in which the desired signal equalizing unit comprises:

a plurality of desired signal forward taps for filtering the data signals received by all antennas in one-to-one correspondence to remove all interference signals from the data signals;

a desired signal generating unit for generating a plurality of assumptive desired signals respectively agreeing with the desired signal received by the antennas at some likelihood one after another;

a desired signal adder for adding the data signals filtered by the desired signal forward taps, subtracting the replicas of the interference signals produced by the desired signal backward taps, and producing a desired output signal each time one assumptive desired signal is output from the desired signal generating unit; and a desired signal subtracting unit for subtracting each of the assumptive desired signals output from the desired signal generating unit from the desired output signal produced by the desired signal adder to obtain a difference as a desired. signal error, each of the interference signal equalizing units comprises:

a plurality of interference signal forward taps for filtering the data signals received by all antennas in one-to-one correspondence to remove the (N−1) other interference signals and the desired signal from the data signals;

an interference signal adder for adding the data signals filtered by the interference signal forward taps, subtracting the replicas of the (N−1) other interference signals and the desired signal produced by the interference signal backward taps, and producing an interference output signal;

an interference signal identifying unit for quantizing the interference output signal produced by the interference signal adder to produce an interference identified signal; and an interference signal subtracting unit for subtracting the interference identified signal produced by the interference signal identifying unit from the interference output signal produced by the interference signal adder to obtain a difference as an interference signal error, and the data receiving system further comprising:

a judging unit for selecting a particular assumptive desired signal agreeing with the desired signal from among the assumptive desired signals output from the desired signal generating unit according to the desired signal error obtained by the desired signal subtracting unit and the interference signal errors obtained by the interference signal subtracting units and instructing the desired signal generating unit to make the desired signal generating unit output the particular assumptive desired signal, the particular assumptive desired signal being output as the demodulated desired signal, and a particular interference identified signal relating to the particular assumptive desired signal being output from each of the interference signal identifying units of the interference signal equalizing units as the demodulated interference signal.

24. A data receiving system according to claim 23 in which each of the desired signal backward taps is formed of a weighting unit for weighting one interference identified signal produced by one interference signal identifying unit to produce one replica of one interference signal, and each of the interference signal backward taps is formed of a weighting unit for weighting one interference identified signal produced by one interference signal identifying unit or one assumptive desired signal produced by the desired signal generating unit to produce one replica of one interference signal or the replica of the desired signal.

25. A data receiving system according to claim 23 in which a tap distance in each of the desired and interference signal forward taps is set to 1/M (M is a natural number equal to or higher than 2) of one symbol delay time.

26. A data receiving system according to claim 16 in which the number N of the interference signals is two and the number N+M of the antennas is two.

27. A data receiving system according to claim 16 in which the desired signal equalizing unit comprises:

a plurality of desired signal forward taps for filtering the data signals received by all antennas in one-to-one correspondence to remove all interference signals from the data signals;

a desired signal generating unit for generating a plurality of assumptive desired signals respectively agreeing with the desired signal received by the antennas at some likelihood one after another;

a desired signal adder for adding the data signals filtered by the desired signal forward taps, subtracting a plurality of replicas of the interference signals produced by the desired signal backward taps, and producing a desired output signal each time one assumptive desired signal is output from the desired signal generating unit; and a desired signal subtracting unit for subtracting each of the assumptive desired signals output from the desired signal generating unit from the desired output signal produced by the desired signal adder to obtain a difference as a desired signal error, a first interference signal equalizing unit, which is defined by classifying the interference signal equalizing units into the first interference signal equalizing unit corresponding to a first interference signal and (N−1) second interference signal equalizing units corresponding to (N−1) second interference signals, comprises:

a plurality of first interference signal forward taps for filtering the data signals received by all antennas in one-to-one correspondence to remove the second interference signals and the desired signal from the data signals;

an interference signal generating unit for generating a plurality of assumptive interference signals respectively agreeing with the first interference signal received by the antennas at some likelihood one after another;

a first interference signal adder for adding the data signals filtered by the first interference signal forward taps, subtracting a plurality of replicas of the second interference signals and the desired signal produced by the interference signal backward taps corresponding to the first interference signal equalizing unit, and producing a first interference output signal each time one assumptive interference signal is output from the interference signal generating unit; and a first interference signal subtracting unit for subtracting each of the assumptive interference signals output from the interference signal generating unit from the first interference output signal produced by the first interference signal adder to obtain a difference as a first interference signal error, each of the second interference signal equalizing units comprises:

a plurality of second interference signal forward taps for filtering the data signals received by all antennas in one-to-one correspondence to remove (N−2) other second interference signals other than the particular interference signal, the first interference signal and the desired signal from the data signals;

a second interference signal adder for adding the data signals filtered by the second interference signal forward taps, subtracting a plurality of replicas of the other second interference signals, the first interference signal and the desired signal produced by the interference signal backward taps corresponding to the second interference signal equalizing unit, and producing a second interference output signal each time one assumptive interference signal is output from the interference signal generating unit;

an interference signal identifying unit for quantizing the second interference output signal produced by the second interference signal adder to produce an interference identified signal;

a second interference signal subtracting unit for subtracting the interference identified signal produced by the interference signal identifying unit from the second interference output signal produced by the second interference signal adder to obtain a difference as a second interference signal error; and an interference signal control unit for repeatedly operating the interference signal equalizing unit to obtain a minimized interference signal error each time one assumptive desired signal is output from the desired signal generating unit, and the data receiving system further comprising:

a judging unit for selecting a particular assumptive desired signal agreeing with the desired signal from among the assumptive desired signals output from the desired signal generating unit and a particular assumptive interference signal agreeing with the first interference signal from among the assumptive interference signals output from the interference signal generating unit according to the desired signal error obtained by the desired signal subtracting unit, the first interference signal error obtained by the first interference signal subtracting unit and the minimized interference signal errors obtained by the interference signal control units, instructing the desired signal generating unit to make the desired signal generating unit output the particular assumptive desired signal and instructing the interference signal generating unit to make the interference signal generating unit output the particular assumptive interference signal, the particular assumptive desired signal being output as the demodulated desired signal, the particular assumptive interference signal being output as the demodulated first interference signal, and a particular interference identified signal relating to the particular assumptive desired signal and the particular assumptive interference signal being output from each of the interference signal identifying units of the second interference signal equalizing units as the demodulated interference signal.

28. A data receiving system according to claim 27 in which each of the desired signal backward taps is formed of a weighting unit for weighting one demodulated interference signal produced by the interference signal generating unit or one interference signal identifying unit to produce one replica of one interference signal, and each of the interference signal backward taps is formed of a weighting unit for weighting one demodulated interference signal produced by one second interference signal generating unit, the assumptive interference signal produced by the interference signal generating unit or the assumptive desired signal produced by the desired signal generating unit to produce one replica of one interference signal or the replica of the desired signal.

29. A data receiving system according to claim 27 in which a tap distance in each of the desired signal forward taps and the first and second interference signal forward taps is set to 1/M (M is a natural number equal to or higher than 2) of one symbol delay time.

* * * * *